United States Patent
Aoki

(10) Patent No.: US 8,965,647 B2
(45) Date of Patent: Feb. 24, 2015

(54) CONTROL APPARATUS FOR CONTINUOUSLY VARIABLE TRANSMISSION

(71) Applicant: Honda Motor Co., Ltd., Tokyo (JP)

(72) Inventor: Akihira Aoki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/155,357

(22) Filed: Jan. 15, 2014

(65) Prior Publication Data
US 2014/0200779 A1   Jul. 17, 2014

(30) Foreign Application Priority Data

Jan. 16, 2013  (JP) ................................. 2013-005681

(51) Int. Cl.
*B60W 10/107*   (2012.01)
*B60W 10/06*    (2006.01)

(52) U.S. Cl.
CPC ............. *B60W 10/107* (2013.01); *B60W 10/06* (2013.01)
USPC ................................. 701/58; 701/60; 701/61

(58) Field of Classification Search
CPC ............................ B60W 10/107; B60W 10/06
USPC ........................ 701/58, 60, 61; 700/28, 32, 33
See application file for complete search history.

(56) References Cited

U.S. PATENT DOCUMENTS

| 6,173,227 B1 * | 1/2001 | Speicher et al. ................. 701/51 |
| 7,548,810 B2 | 6/2009 | Aoki |
| 2005/0096822 A1 * | 5/2005 | Aoki ............................... 701/51 |
| 2011/0160969 A1 | 6/2011 | Oguri et al. |

FOREIGN PATENT DOCUMENTS

| EP | 1369625 A2 * | 12/2003 | .............. F16H 61/00 |
| EP | 1529988 A2 * | 5/2005 | .............. F16H 61/00 |
| JP | 4376034 B2 | 6/2005 | |
| JP | 2009-190572 | 8/2009 | |
| JP | 2011-149470 | 8/2011 | |
| JP | 2012-97783 | 5/2012 | |

* cited by examiner

*Primary Examiner* — Mary Cheung
*Assistant Examiner* — Brian P Sweeney
(74) *Attorney, Agent, or Firm* — Mori & Ward, LLP

(57) ABSTRACT

A control apparatus for a continuously variable transmission is capable of continuously changing an output of an internal combustion engine mounted on a vehicle and allowing a transmission mode to be switchable between a continuous transmission mode in which a transmission ratio is set continuously and a stepped transmission mode in which the transmission ratio is set stepwise. A transmission mode selector is configured to change the transmission mode in such a manner that in a case where the stepped transmission mode is selected, when a engine rotation speed reaches a first predetermined rotation speed, then falls below a second predetermined rotation speed which is lower than the first predetermined rotation speed, and further falls below a third predetermined rotation speed, the transmission mode is switched from the stepped transmission mode to the continuous transmission mode.

9 Claims, 18 Drawing Sheets

CONTROL APPARATUS FOR CONTINUOUSLY VARIABLE TRANSMISSION

CROSS-REFERENCE TO RELATED APPLICATIONS

The present application claims priority under 35 U.S.C. §119 to Japanese Patent Application No. 2013-005681, filed Jan. 16, 2013, entitled "Control Apparatus for Continuously Variable Transmission." The contents of this application are incorporated herein by reference in their entirety.

BACKGROUND

1. Field

The present disclosure relates to a control apparatus for a continuously variable transmission.

2. Description of the Related Art

As a conventional control apparatus for a continuously variable transmission, for example, the control apparatus described in Japanese Patent No. 4376034 is known. The control apparatus allows the transmission mode of the continuously variable transmission to be switched between a continuous transmission mode and a stepped transmission mode, and controls the transmission ratio of the continuously variable transmission according to the transmission mode currently executed. For example, during execution of the continuous transmission mode, a target rotation speed NCMD is set continuously according to a vehicle speed VP and an accelerator opening AP, and the transmission ratio is controlled so that the engine rotation speed NE follows the target rotation speed NCND.

During execution of the stepped transmission mode, an upper limit rotation speed NLMT and an up shift rotation speed NUP are each determined according to the vehicle speed VP and the accelerator opening AP. In a time period after the engine rotation speed NE reaches the upper limit rotation speed NLMT until the engine rotation speed NE becomes lower than or equal to the up shift rotation speed NUP, transfer torque reduction control process for a start clutch and reduction control process for the engine torque are performed. When the engine rotation speed NE becomes lower than or equal to the up shift rotation speed NUP, the transfer torque reduction control process for the start clutch and the reduction control process for the engine torque are terminated.

The switching control of the transmission mode is performed in the following manner. For example, during execution of the continuous transmission mode, a start rotation speed NSS in the stepped transmission mode is determined according to the vehicle speed VP, and when each of the engine rotation speed NE and the target rotation speed NCMD is higher than the start rotation speed NSS in the stepped transmission mode, and a change amount DTH of a throttle valve opening TH is greater than a predetermined amount DTHSS, the transmission mode is switched from the continuous transmission mode to the stepped transmission mode.

On the other hand, during execution of the stepped transmission mode, when the engine rotation speed NE is lower than or equal to the upper limit rotation speed NLMT, and the change amount DTH of the throttle valve opening TH becomes less than the predetermined amount DTHSS, or when in up shift process, the engine rotation speed NE becomes lower than an end rotation speed NES which is determined according to the vehicle speed VP, the transmission mode is switched from the stepped transmission mode to the continuous transmission mode.

SUMMARY

According to one aspect of the present invention, a control apparatus for a continuously variable transmission is capable of continuously changing an output of an internal combustion engine mounted on a vehicle and allowing a transmission mode to be switchable between a continuous transmission mode in which a transmission ratio is set continuously and a stepped transmission mode in which the transmission ratio is set stepwise. The control apparatus includes a driving condition parameter detector, an engine rotation speed detector, a drive feeling setting device, a predetermined rotation speed setting device, a transmission mode selector, and a transmission ratio controller. The driving condition parameter detector is configured to detect a driving condition parameter which indicates a driving condition of the vehicle. The engine rotation speed detector is configured to detect an engine rotation speed. The drive feeling setting device sets a drive feeling for the vehicle. The predetermined rotation speed setting device is configured to set one of a first predetermined rotation speed a second predetermined rotation speed and a third predetermined rotation speed according to a setting condition for drive feeling in the drive feeling setting device. The transmission mode selector is configured to select one of the continuous transmission mode and the stepped transmission mode as the transmission mode. The transmission ratio controller is configured to control the transmission ratio according to the driving condition parameter detected by the driving condition parameter detector and the transmission mode selected by the transmission mode selector. The transmission ratio controller is configured to control the transmission ratio in such a manner that in a case where the stepped transmission mode is selected, when the engine rotation speed reaches the first predetermined rotation speed, the transmission ratio is controlled at a value for a higher speed, different from a value before the engine rotation speed reaches the first predetermined rotation speed so that the engine rotation speed becomes lower than the first predetermined rotation speed. The transmission mode selector is configured to change the transmission mode in such a manner that in a case where the stepped transmission mode is selected, when the engine rotation speed reaches the first predetermined rotation speed, then falls below the second predetermined rotation speed which is lower than the first predetermined rotation speed, and further falls below the third predetermined rotation speed, the transmission mode is switched from the stepped transmission mode to the continuous transmission mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
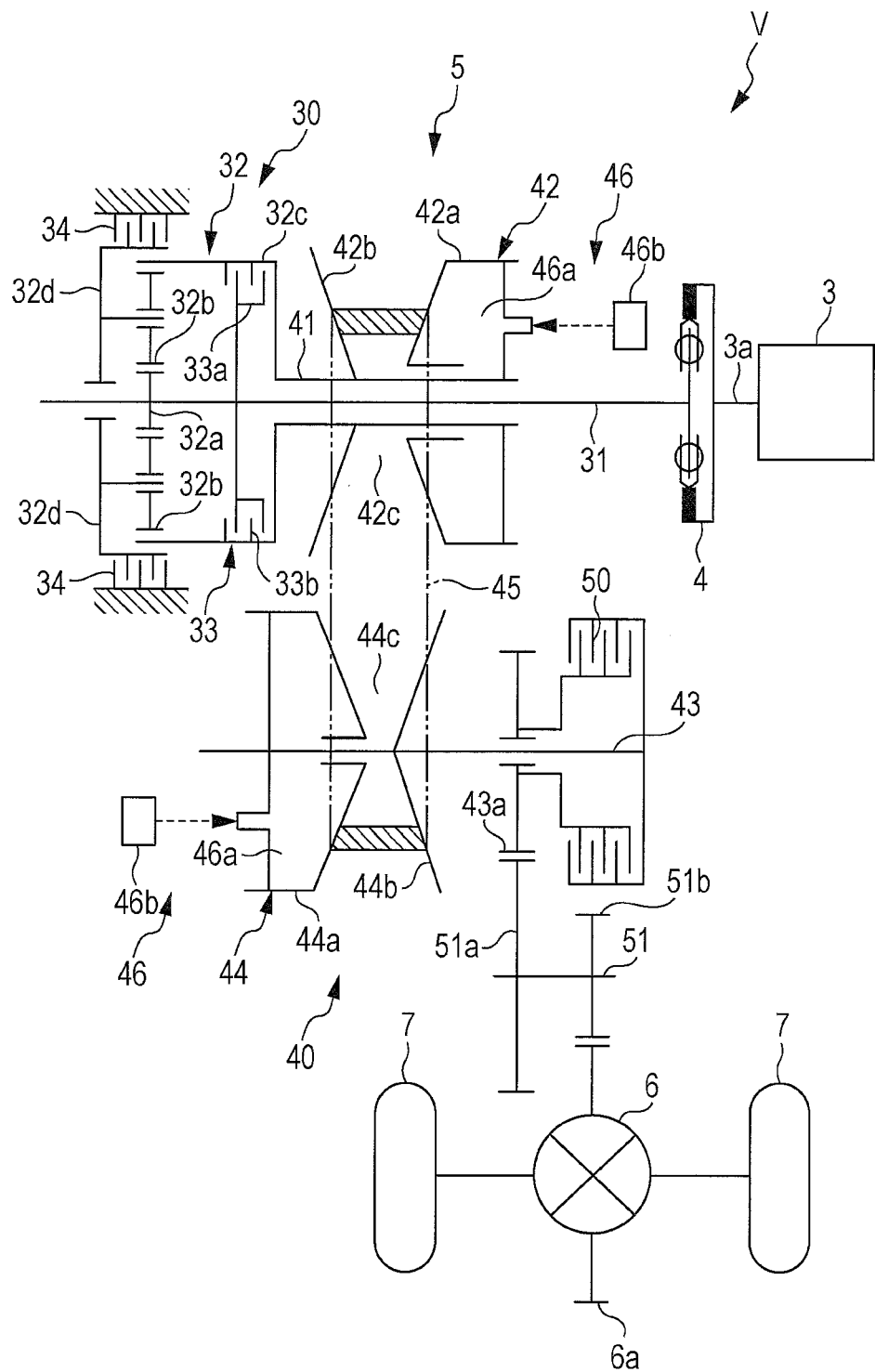
FIG. 1 is a diagram schematically illustrating the configuration of a vehicle drive system equipped with an automatic transmission which is controlled by a control apparatus according to an embodiment of the present disclosure.

The embodiments will now be described with reference to the accompanying drawings, wherein like reference numerals designate corresponding or identical elements throughout the various drawings.

Figure 2:
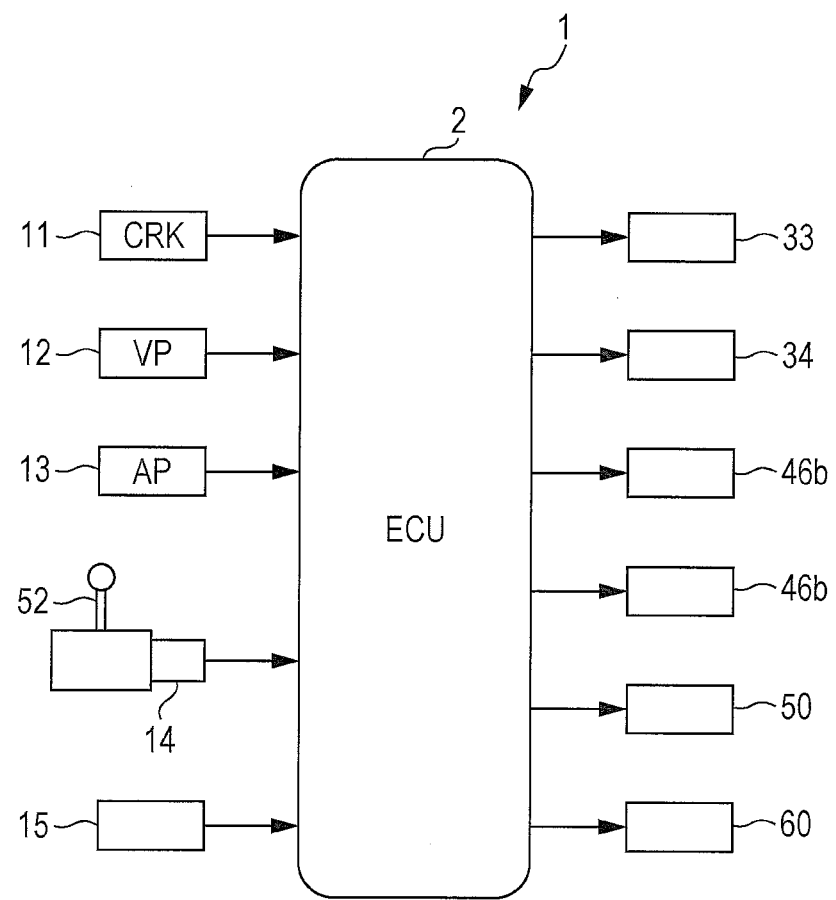
FIG. 2 is a block diagram illustrating an electrical configuration of the control apparatus.

Hereinafter, a control apparatus for a continuously variable transmission according to an embodiment of the present disclosure will be described with reference to the accompanying drawings. FIG. 1 illustrates a schematic configuration of an automatic transmission and a drive system of a four-wheel vehicle V equipped with the automatic transmission which is controlled by a control apparatus according to an embodiment of the present disclosure. As illustrated in FIG. 2, the control apparatus 1 includes ECU 2 which performs various types of control process such as a process as described below.

As illustrated in FIG. 1, the vehicle V is equipped with a gasoline-powered internal combustion engine (hereinafter referred to as an "engine") 3. The engine 3 is connected to driving wheels 7, 7 via a flywheel 4, an automatic transmission 5, and a differential gear mechanism 6, and configured to transmit the torque of the engine 3 to the driving wheels 7, 7 via these components 4 to 6.

The flywheel 4 is connected to a crankshaft 3a of the engine 3, and configured to reduce a variation in the torque of the engine 3 and to transmit the torque with attenuated torsion vibration to the automatic transmission 5.

The automatic transmission 5 includes a forward-reverse drive switching mechanism 30, a continuously variable transmission 40, and a start clutch 50. The forward-reverse drive switching mechanism 30 includes an input shaft 31, and a planetary gear 32 which is mounted on the input shaft 31. The input shaft 31 is connected to the flywheel 4 at one end and rotatably penetrates through a hollow main shaft 41. The planetary gear 32 includes a sun gear 32a, a carrier 32d which rotatably supports a plurality of (for example, four) pinion gears 32b engaged with the sun gear 32a, and a ring gear 32c engaged with the pinion gears 32b.

The sun gear 32a is provided integrally with the input shaft 31, a portion of the planetary gear 32 is connected to a clutch inner 33a of a forward clutch 33, the portion being located nearer to the engine 3 than the sun gear 32a of the input shaft 31, and a clutch outer 33b is connected to the ring gear 32c and the main shaft 41. Connection and disconnection of the forward clutch 33 is controlled by the ECU 2 described below. A reverse brake 34 is connected to the carrier 32d. The operation of the reverse brake 34 is also controlled by the ECU 2.

With the above configuration of the forward-reverse drive switching mechanism 30, when the vehicle V is driven forward, the reverse brake 34 is released and the forward clutch 33 is connected, and the input shaft 31 and the main shaft 41 are thereby connected to each other, and rotation of the input shaft 31 is directly transmitted to the main shaft 41. Each pinion gear 32b does not rotate around its shaft as a center, and the carrier 32d rotates integrally with the input shaft 31 in the same direction. As described above, when the vehicle V is driven forward, the main shaft 41 and the input shaft 31 rotate in the same direction at the same rotation speed. On the other hand, when the vehicle V is driven in reverse, the forward clutch 33 is disconnected and the reverse brake 34 is engaged, and the carrier 32d is thereby locked. Thus, rotation of the input shaft 31 is transmitted to the ring gear 32c via the sun gear 32a and the pinion gears 32b, and consequently, the ring gear 32c and the main shaft 41 connected to the ring gear 32c rotate in the direction opposite to the rotational direction of the input shaft 31. In this manner, when the vehicle V is driven in reverse, the main shaft 41 rotates in the direction opposite to the rotational direction of the input shaft 31.

The continuously variable transmission 40 is a belt type and includes the above-mentioned main shaft 41, a drive pulley 42, a counter shaft 43, and a driven pulley 44.

The drive pulley 42 has a frustum-shaped movable portion 42a and a fixed portion 42b. The movable portion 42a is mounted on the main shaft 41 such that the movable portion 42a is movable in the axial direction of the main shaft 41 but not rotatable around the main shaft 41. The fixed portion 42b is fixed to the main shaft 41 so as to face the movable portion 42a. The facing surfaces of the movable portion 42a and the fixed portion 42b are inclined such that the surfaces are tapered toward the central main shaft 41. Thus, the movable portion 42a, the fixed portion 42b, and the main shaft 41 form a V-shaped belt groove 42c.

The driven pulley 44 is formed similarly to the drive pulley 42, and has a frustum-shaped movable portion 44a and a fixed portion 44b. The movable portion 44a is mounted on the counter shaft 43 such that the movable portion 44a is movable in the axial direction of the counter shaft 43 but not rotatable around the counter shaft 43. The fixed portion 44b is fixed to the counter shaft 43 so as to face the movable portion 44a. The facing surfaces of the movable portion 44a and the fixed portion 44b are inclined in the same manner as the facing surfaces of the movable portion 42a and the fixed portion 42b, and the movable portion 44a, the fixed portion 44b, and the counter shaft 43 form a V-shaped belt groove 44c.

A metal belt 45 is wound between the belt grooves 42c, 44c of the pulleys 42, 44. In addition, the movable portions 42a, 44a are respectively provided with pulley width variable mechanisms 46, 46 which allow the movable portions 42a, 44a to be moved in the axial direction. The pulley width variable mechanisms 46 include respective oil chambers 46a provided in the back of movable portions 42a or 44a, and hydraulic pressure control valves 46b which control hydraulic pressure supplied to the respective oil chambers 46a. Opening of the hydraulic pressure control valves 46b is controlled by the ECU 2.

With the above configuration, in the continuously variable transmission 40, opening of the hydraulic pressure control valves 46b is controlled by the ECU 2, and the hydraulic pressure of the oil chambers 46a is thereby controlled. The movable portions 42a, 44a are positioned in a location according to the hydraulic pressure. In this manner, the distances between the movable portions 42a, 44a and the fixed portions 42b, 44b, that is, the widths of the belt grooves 42c, 44c are continuously set individually, and thereby the rotational speed ratio between the main shaft 41 and the counter shaft 43, that is, the transmission ratio of the continuously variable transmission 40 is controlled continuously.

As described below, the transmission mode of the continuously variable transmission 40 is controlled by switching between the continuous transmission mode and the stepped transmission mode according to a driving condition of the vehicle V. In the above control, the transmission ratio is controlled continuously in the continuous transmission mode (hereinafter referred to as a "CVT mode"), whereas the transmission ratio is controlled stepwise in the stepped transmission mode (hereinafter referred to as an "AT mode").

The start clutch 50 allows connection and disconnection between the counter shaft 43 and a gear 43a rotatably provided on the counter shaft 43, and the operation of the start clutch 50 is controlled by the ECU 2. The start clutch 50 is configured to adjust an engaging force between the gear 43a and the counter shaft 43 under control of an actuator (not illustrated) controlled by the ECU 2. The transmission torque of the start clutch 50 is thereby controlled by the ECU 2. The gear 43a is engaged with a gear 6a of the differential gear mechanism 6 via idler gears 51a, 51b of varying sizes provided on an idler shaft 51. With the above configuration, when the start clutch 50 is connected, rotation of the counter shaft 43 is transmitted to the driving wheels 7, 7 via these gears 43a, 51a, 51b, and 6a, and thus the vehicle V starts to move.

As illustrated in FIG. 2, the vehicle V is equipped with a shift lever 52. The shift lever 52 is configured to allow one of the following seven positions to be selected as a shift position: parking position (P), reverse position (R), neutral position (N), drive position (D), sport position (S), and low position (L). In the control apparatus 1, when the shift lever 52 is in the sport position, the transmission ratio of the continuously variable transmission 40 is controlled to be higher in order to keep the engine 3 operational at a higher rotation speed than that in the drive position.

In addition, the ECU 2 is electrically connected to a crank angle sensor 11, a vehicle speed sensor 12, an accelerator opening sensor 13, a shift position sensor 14, a drive feeling mode setting switch 15, and a drive feeling mode display light 60.

The crank angle sensor 11 (engine rotation speed detection unit) outputs CRK signal as a pulse signal to the ECU 2 along with rotation of the crankshaft 3a of the engine 3. A pulse of the CRK signal is outputted every predetermined crank angle (for example, 1°), and the ECU 2 determines an engine rotation speed NE of the engine 3 (hereinafter referred to as an "engine rotation speed") based on the CRK signal.

The vehicle speed sensor 12 is mounted on an axle (not illustrated) of the vehicle V to detect a running speed (hereinafter referred to as a "vehicle speed") VP of the vehicle V, and outputs a detection signal indicating VP to the ECU 2. In the present embodiment, the vehicle speed sensor 12 corresponds to the driving condition parameter detection unit and the vehicle speed detection unit, and the vehicle speed VP corresponds to the driving condition parameter.

In addition, the accelerator opening sensor 13 detects an amount of operation (hereinafter referred to as an "accelerator opening") AP performed by a driver on an accelerator pedal (not illustrated) of the vehicle V, and outputs a detection signal indicating AP to the ECU 2. In the present embodiment, the accelerator opening sensor 13 corresponds to the driving condition parameter detection unit, the load parameter detection unit, and the acceleration operation amount detection unit; and the accelerator opening AP corresponds to the driving condition parameter, the load parameter, and the acceleration operation amount. The shift position sensor 14 outputs a shift position signal to the ECU 2, the shift position signal indicating a shift position of the shift lever 52. The ECU 2 recognizes the shift position of the shift lever 52 based on the shift position signal.

Figure 3:
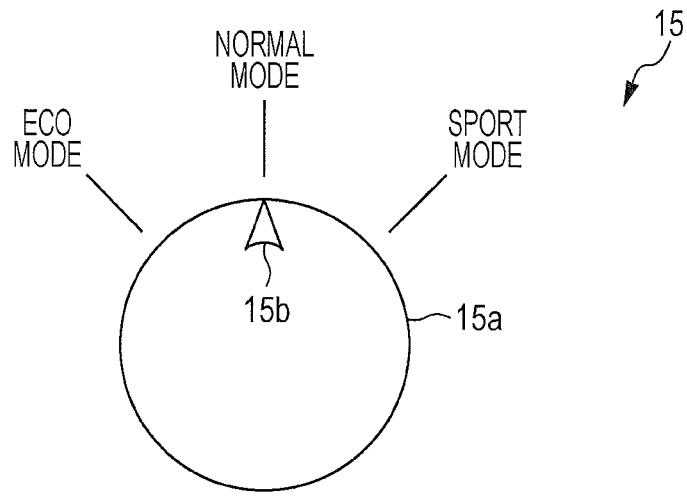
FIG. 3 is a diagram illustrating a drive feeling mode setting switch.

On the other hand, the drive feeling mode setting switch 15 (drive feeling setting device) is a dial switch and provided in the vicinity of the shift lever 52. As illustrated in FIG. 3, the drive feeling mode setting switch 15 includes a dial 15a having an arrow 15b which can be continuously rotated between eco mode position, normal mode position, and sport mode position, the eco mode position being indicated by a display of ECO MODE, the normal mode position being indicated by a display of NORMAL MODE, the sport mode position being indicated by a display of SPORT MODE.

In the drive feeling mode setting switch 15, when a driver desires to place the highest priority on favorable accelerating performance or accelerator responsiveness in running conditions, the sport mode position is selected; when desiring to place the highest priority on fuel efficiency in running conditions, the eco mode position is selected; and when desiring to achieve favorable accelerating performance, accelerator responsiveness, and fuel efficiency in running conditions at the same time, the eco mode position is selected.

The drive feeling mode setting switch 15 outputs an output signal to the ECU 2, the output signal according to the position of the arrow 15b of the dial 15a. The value of an output signal (hereinafter referred to as a "switch output value") SW_OUT of the drive feeling mode setting switch 15 indicates a predetermined minimum value SW_min when the arrow 15b is in the eco mode position, a predetermined middle value SW_mid when the arrow 15b is in the normal mode position, and a predetermined maximum value SW_max when the arrow 15b is in the sport mode position. These three values SW_min, SW_mid, and SW_max are set so as to satisfy that SW_min<SW_mid<SW_ma.

In addition, when the dial 15a is rotated between the eco mode position and the sport mode position, the switch output value SW_OUT changes linearly between the minimum value SW_min and the maximum value SW_max according to the amount of the rotation of the dial 15a.

The drive feeling mode display light 60 is provided on an instrument panel (not illustrated) of the vehicle V and configured to display a setting position of the drive feeling mode setting switch 15, such as the above-described normal mode position when a drive signal corresponding to the above-mentioned output signal value SW_OUT is supplied from the ECU 2.

On the other hand, the ECU 2 includes a microcomputer having a CPU, a RAM, a ROM, and an I/O interface (any of these is not illustrated), and controls the operation of the automatic transmission 5 and the engine 3 according to detection signals of the above-mentioned various types of sensors 11 to 14 and an output signal of the drive feeling mode setting switch 15. Specifically, the ECU 2 performs an operation such as a transmission mode control process as described below.

In the present embodiment, the ECU 2 corresponds to the engine rotation speed detection unit, the predetermined rotation speed setting unit, the transmission mode selection unit, the transmission ratio control unit, the compensating unit, the target rotation speed setting unit, the fourth predetermined rotation speed setting unit, the decrease level parameter calculation unit, the reference decrease level setting unit, the increase level calculation unit, the reference increase level setting unit, the transfer torque reduction unit, and the input torque reduction unit.

Hereinafter, the process of determining a drive feeling index value DRVF_IDX will be described with reference to FIG. 4. As described below, the determination process is for determining a drive feeling index value DRVF_IDX according to a switch output value SW_OUT, and is performed by the ECU 2 every predetermined control cycle (for example, 10 msec). Each of the various values determined in the following control processes is stored in the RAM of the ECU 2.

Figure 4:
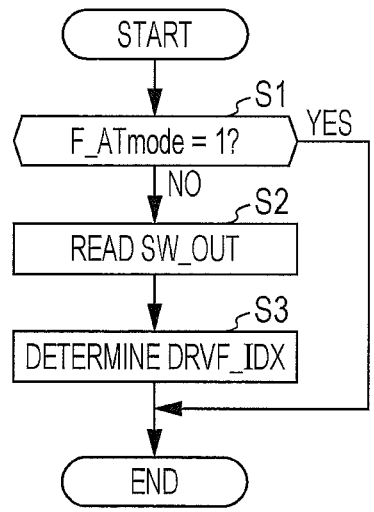
FIG. 4 is a flow chart illustrating a process of calculating a drive feeling index value DRVF_IDX.

As illustrated in FIG. 4, first, in step 1 (which is abbreviated as "S1" in FIG. 4 and the subsequent steps 2, 3 are abbreviated similarly), it is determined whether or not AT mode flag F_ATmode is "1". The AT mode flag F_ATmode indicates whether or not the transmission mode is AT mode which is determined in the below-described determination process for transmission mode.

When the determination result in step 1 is YES and the transmission mode is AT mode, the present process is terminated. On the other hand, when the determination result in step 1 is NO and the transmission mode is CVT mode, the process proceeds to step 2 and a switch output value SW_OUT is read.

Figure 5:
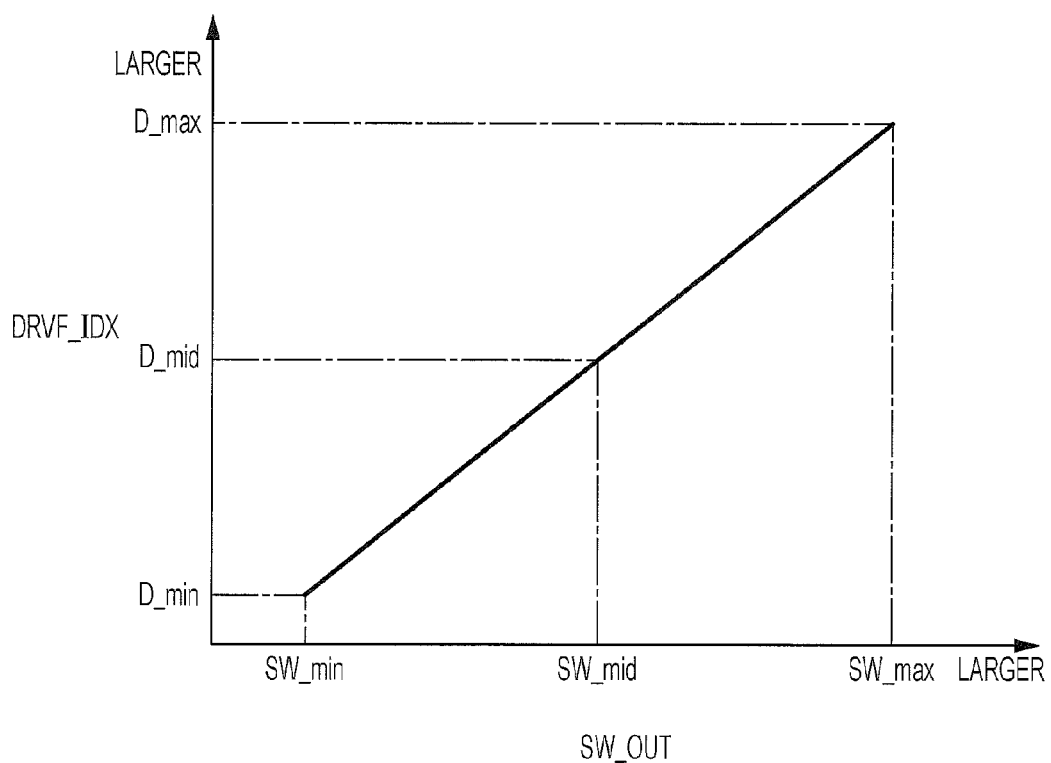
FIG. 5 is a graph illustrating an example of a map which is used for calculation of the drive feeling index value DRVF_IDX.

Subsequently, the process proceeds to step 3, and a drive feeling index value DRVF_IDX is determined by referring to the map illustrated in FIG. 5 according to the switch output value SW_OUT. As illustrated in FIG. 5, in the map, the drive feeling index value DRVF_IDX is set to vary linearly with the switch output value SW_OUT and to increase as the switch output value SW_OUT increases.

More specifically, the drive feeling index value DRVF_IDX is set to a predetermined minimum value D_min when SW_OUT=SW_min, to a predetermined middle value D_mid when SW_OUT=SW_mid, and to a predetermined maximum value D_max when SW_OUT=SW_max. This is because when the switch output value SW_OUT is increased, the arrow 15b of the drive feeling mode setting switch 15 comes closer to the sport mode position, thereby indicating a driver's request for more favorable acceleration feeling and accelerator responsive feeling, and to cope with this situation, the above setting is made.

As described above, after the drive feeling index value DRVF_IDX is determined in step 3, the present process is terminated.

Next, the determination process for transmission mode will be described with reference to FIG. 6. As described below, the determination process determines whether AT mode or CVT mode is to be executed as a transmission mode for the continuously variable transmission, and the process is performed by the ECU 2 every predetermined control cycle (for example, 10 msec).

Figure 6:
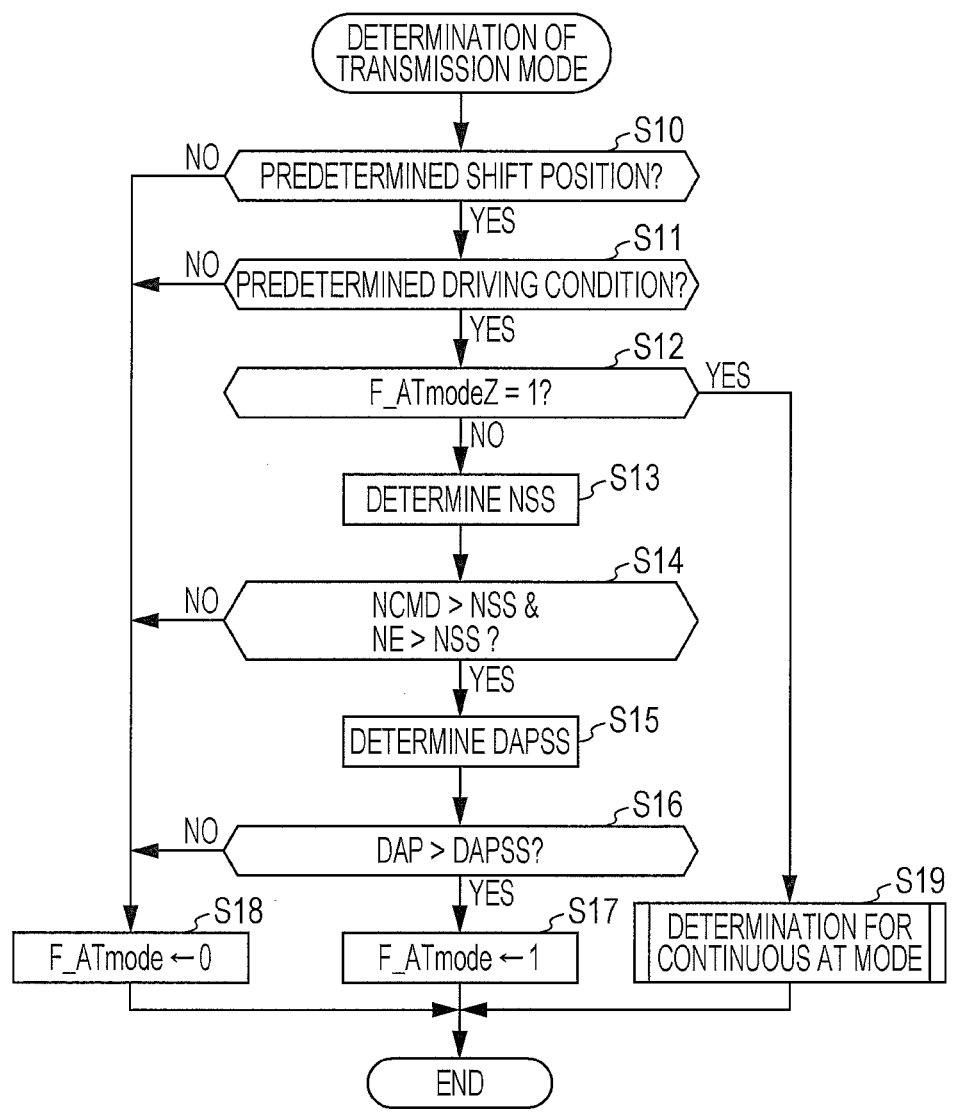
FIG. 6 is a flow chart illustrating a process of determining a transmission mode.

As illustrated in FIG. 6, first, in step 10, it is determined whether or not the shift position of the shift lever 52 is in a predetermined shift position. In the above step, the predetermined shift position corresponds to the above-mentioned drive position and sport position. When the determination result is NO, it is determined that a driver has no request for acceleration and thus CVT mode is to be executed, then the process proceeds to step 18 and AT mode flag F_ATmode is set to "0" to reflect the determination. Subsequently, the present process is terminated.

On the other hand, when the determination result is YES, the process proceeds to step 11 and it is determined whether or not the vehicle V is in a predetermined running condition. In the above determination, the predetermined running condition is met when the following three conditions (a1) to (a3) are all satisfied. (a1) the vehicle speed VP is higher than or equal to a predetermined vehicle speed. (a2) the accelerator opening AP is in a predetermined range and the change amount of the accelerator opening AP is in a predetermined range. (a3) the shift position of the shift lever 52 has not been changed between the previous control timing and the current control timing.

When the determination result in step 11 is NO, it is determined that CVT mode is to be executed, and the process proceeds to step 18, then the present process is terminated.

On the other hand, when the determination result in step 11 is YES, the process proceeds to step 12 and it is determined whether or not the previous value F_ATmodeZ of the AT mode flag is "1". When the determination result is NO and execution conditions for AT mode were not satisfied in the previous control timing, the process proceeds to step 13, and AT mode start rotation speed NSS (a fourth predetermined rotation speed) is determined by referring to the map (particularly the data indicated by a solid line) illustrated in FIG. 7 according to the vehicle speed VP and the drive feeling index value DRVF_IDX.

Figure 7:
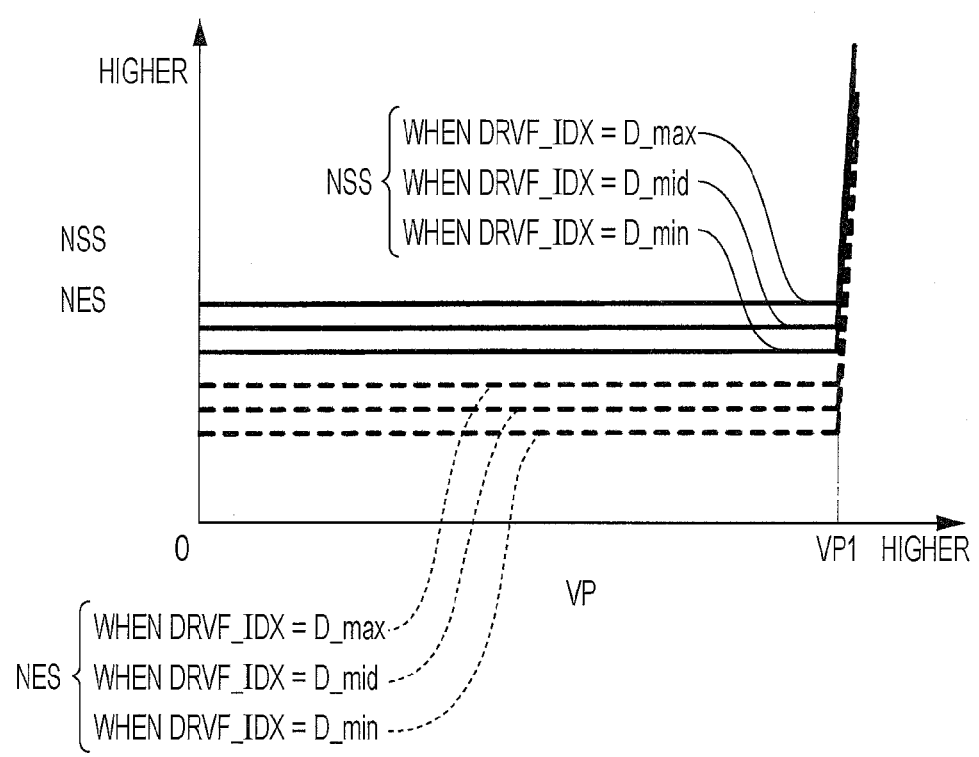
FIG. 7 is a graph illustrating an example of a map which is used for calculation of AT mode start rotation speed NSS and AT mode end rotation speed NES.

As illustrated in FIG. 7, in the map, when the vehicle speed VP is lower than or equal to a predetermined vehicle speed VP1 (for example, 90 km/h), the AT mode start rotation speed NSS is set to a constant value, whereas when the vehicle speed VP exceeds the predetermined vehicle speed VP1, the AT mode start rotation speed NSS is set to be increased rapidly. This is because AT mode is intended to start with a sufficiently increased engine rotation speed NE before the vehicle speed VP reaches the predetermined vehicle speed VP1. When the vehicle is moving at a vehicle speed VP exceeding the predetermined vehicle speed VP1, even when up shift control is performed in AT mode, acceleration feeling due to the up shift control is not achieved so much.

In the region where VP≤VP1, the AT mode start rotation speed NSS is set to a higher value as the drive feeling index value DRVF_IDX is increased. This is because an increased drive feeling index value DRVF_IDX reflects a driver's request for more favorable accelerating performance and accelerator responsiveness, and in order to cope with the request, AT mode is started in a higher rotational speed range. The data of AT mode end rotation speed NES indicated by a dashed line in FIG. 7 is used in continuous AT mode determination process described below.

In step 14 subsequent to step 13, it is determined whether or not the target rotation speed NCMD and the engine rotation speed NE are both higher than the AT mode start rotation speed NSS. The target rotation speed NCMD is determined in the below-described transmission mode control process. When the determination result is NO, and NCMD≥NSS or NE≥NSS, it is determined that CVT mode is to be executed, and the process proceeds to step 18, then the present process is terminated as described above.

Figure 8:
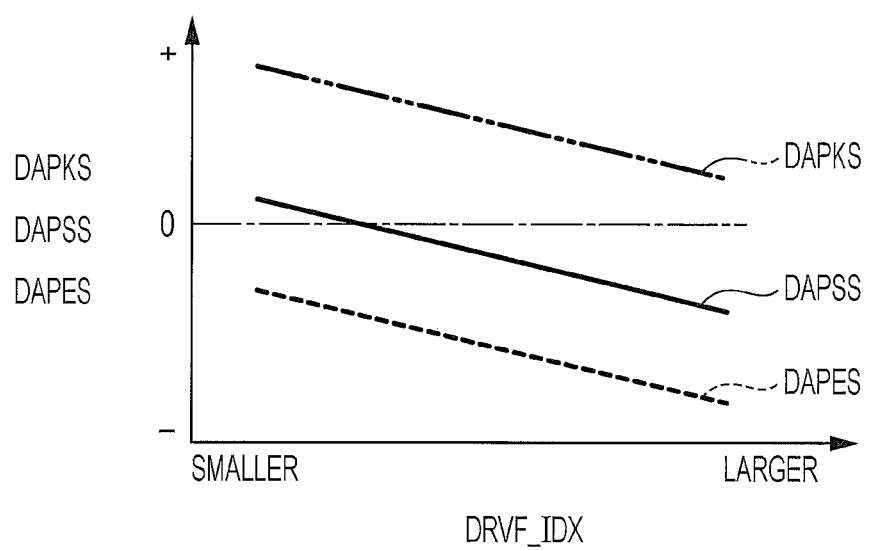
FIG. 8 is a graph illustrating an example of a map which is used for calculation of AT mode release determination value DAPKS, AT mode start determination value DAPSS, and AT mode end determination value DAPES.

On the other hand, when the determination result in step 14 is YES, the process proceeds to step 15, and AT mode start determination value DAPSS is determined by referring to the map (particularly the data indicated by a solid line) illustrated in FIG. 8 according to the drive feeling index value DRVF_IDX. As illustrated in FIG. 8, in the map, the AT mode start determination value DAPSS is set to vary linearly with the drive feeling index value DRVF_IDX and to decrease as the drive feeling index value DRVF_IDX is increased. This is because an increased drive feeling index value DRVF_IDX reflects a driver's request for more favorable accelerating performance and accelerator responsiveness, and in order to cope with the request, AT mode operation is performed even under conditions that an operation amount of the accelerator pedal is relatively small (that is, the execution range for AT mode is extended). The data of AT mode release determination value DAPKS indicated by a two-dot chain line and the data of AT mode end determination value DAPES indicated by a dashed line in FIG. 8 are used in the continuous AT mode determination process described below.

Subsequently, the process proceeds to step 16 and it is determined whether or not an accelerator change amount DAP is greater than the above-mentioned AT mode start determination value DAPSS. The accelerator change amount DAP is a deviation between the current value and the previous value of the accelerator opening AP. In the present embodiment, the accelerator change amount DAP corresponds to the decrease level parameter and the increase level; and the AT mode start determination value DAPSS corresponds to the reference decrease level.

When the determination result in step 16 is NO, that is, DAP≤DAPSS, the accelerator change amount DAP is small and a driver's request level for accelerating performance and accelerator responsiveness is low, and thus it is determined that AT mode is to be prohibited and CVT mode is to be executed. The process proceeds to step 18, then the present process is terminated as described above.

On the other hand, when the determination result in step 16 is YES, it is determined that the execution conditions for AT mode are satisfied and AT mode is to be executed. The process proceeds to step 17 and the AT mode flag F_ATmode is set to "1" to reflect the determination, and subsequently, the present process is terminated.

When the aforementioned determination result in step 12 is YES, that is, the execution conditions for AT mode were satisfied in the previous control timing, the process proceeds to step 19 and the continuous AT mode determination process is performed. The continuous AT mode determination process determines whether or not AT mode is to be continued, and is specifically performed as illustrated in FIG. 9.

Figure 9:
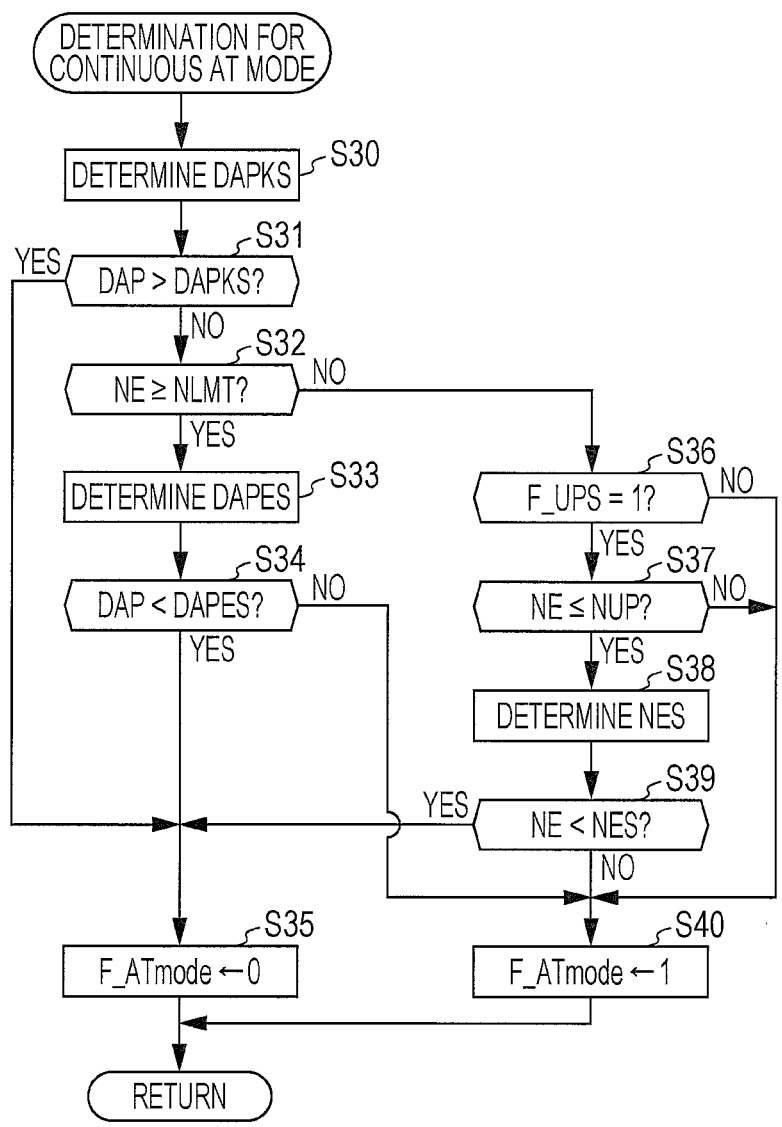
FIG. 9 is a flow chart illustrating a determination process for continuous AT mode.

As illustrated in FIG. 9, first, in step 30, AT mode release determination value DAPKS is determined by referring to the above-described map (particularly the data indicated by a two-dot chain line) illustrated in FIG. 8 according to the drive feeling index value DRVF_IDX. In the map, the AT mode release determination value DAPKS (reference increase level) is set to vary linearly with the drive feeling index value DRVF_IDX and to decrease as the drive feeling index value DRVF_IDX is increased. This is based on the same reason for the above-described manner how the AT mode start determination value DAPSS is set.

Subsequently, the process proceeds to step 31, and it is determined whether or not the accelerator change amount DAP is greater than the AT mode release determination value DAPKS. When the determination result is YES, it is determined that AT mode is to be terminated and CVT mode is to be executed, then the process proceeds to step 35 and the AT mode flag F_ATmode is set to "0" to reflect the determination, then the present process is terminated.

On the other hand, when the determination result in step 31 is NO, the process proceeds to step 32 and it is determined whether or not the engine rotation speed NE is higher than or equal to an upper limit rotation speed NLMT. The upper limit rotation speed NLMT (a first predetermined rotation speed) is determined in the transmission mode control process as described below. When the determination result is YES, the process proceeds to step 33, and AT mode end determination value DAPES is determined by referring to the above-described map (particularly the data indicated by a dashed line) illustrated in FIG. 8 according to the drive feeling index value DRVF_IDX.

In the map, the AT mode end determination value DAPES (reference decrease level) is set to vary linearly with the drive feeling index value DRVF_IDX and to decrease as the drive feeling index value DRVF_IDX is increased. This is based on the same reason for the above-described manner how the AT mode start determination value DAPSS is set. The AT mode end determination value DAPES is set to a smaller value than the AT mode start determination value DAPSS for the drive feeling index value DRVF_IDX. This is for the purpose of extending the execution range for AT mode and preventing chattering in control.

Subsequently, the process proceeds to step 34 and it is determined whether or not the accelerator change amount DAP is less than the AT mode end determination value DAPES. When the determination result is YES, it is determined that AT mode is to be terminated and CVT mode is to be executed, and as described above, the AT mode flag F_ATmode is set to "0" in step 35, then the present process is terminated.

On the other hand, when the determination result in step 34 is NO, it is determined that AT mode is to be continued, and the process proceeds to step 40 and the AT mode flag F_ATmode is set to "1" to reflect the determination, then the present process is terminated.

When the determination result in the above-described step 32 is NO, the process proceeds to step 36 and it is determined whether or not an up shift transmission flag F_UPS is "1". The up shift transmission flag F_UPS indicates whether or not up shift transmission control is being performed in the below-described AT mode control process, and is set in the AT mode control process as described below.

When the determination result in step 36 is YES and up shift transmission control is being performed in the AT mode control process, the process proceeds to step 37 and it is determined whether or not the engine rotation speed NE is lower than or equal to the up shift rotation speed NUP. The up shift rotation speed NUP (a second predetermined rotation speed) is set in the below-described AT mode control process.

When the determination result in step 37 is YES, the process proceeds to step 38, and AT mode end rotation speed NES is determined by referring to the above-described map (particularly the data indicated by a dashed line) illustrated in FIG. 7 according to the drive feeling index value DRVF_IDX. As illustrated in FIG. 7, in the map, the AT mode end rotation speed NES (a third predetermined rotation speed) is set to a higher constant value in the region where VP≤VP1 as the drive feeling index value DRVF_IDX is increased, and the AT mode end rotation speed NES is increased rapidly in the region where VP>VP1. This is based on the same reason for the manner how the AT mode start rotation speed NSS is set.

The AT mode end rotation speed NES is set to a lower value than the AT mode start rotation speed NSS for the vehicle speed VP. This is for the purpose of extending the execution range for AT mode and preventing chattering in control. In addition, the AT mode end rotation speed NES is set to a lower value than the above-described up shift rotation speed NUP for the vehicle speed VP.

In step 39 subsequent to step 38, it is determined whether or not the engine rotation speed NE is lower than the AT mode end rotation speed NES. When the determination result is YES, it is determined that AT mode is to be terminated and CVT mode is to be executed, and as described above, the AT mode flag F_ATmode is set to "0" in step 35, then the present process is terminated.

On the other hand, when the determination result in step 39 is NO and NES≤NE≤NUP, it is determined that AT mode is to be continued, and as described above, the AT mode flag F_ATmode is set to "1" in step 40, then the present process is terminated.

On the other hand, when the determination result in the above-described step 36 or 37 is NO, that is, when up shift transmission control is not being performed in AT mode, or NUP<NE is satisfied, it is determined that AT mode is to be continued, and as described above, the AT mode flag F_ATmode is set to "1" in step 40, then the present process is terminated.

Returning to FIG. 6, the continuous AT mode determination process is performed as described above in step 19, then the present process is terminated.

Next, the transmission mode control process will be described with reference to FIG. 10. As described below, the transmission mode control process is such that the control process for the transmission mode of the continuously variable transmission 40 is switched between AT mode control process and CVT mode control process, and the transmission mode control process is performed by the ECU 2 every predetermined control cycle (for example, 10 msec).

Figure 10:
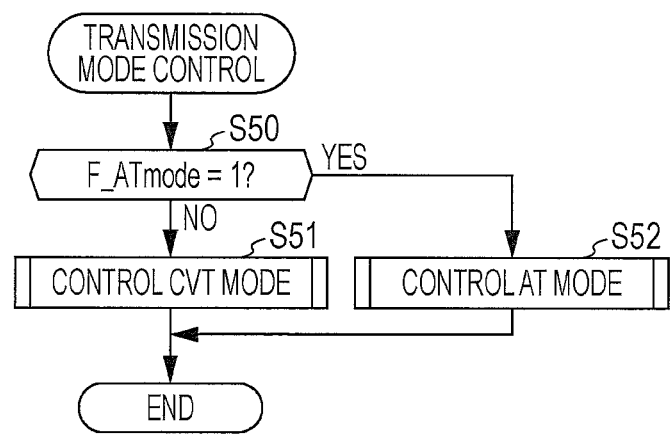
FIG. 10 is a flow chart illustrating a transmission mode control process.

As illustrated in FIG. 10, first, in step 50, it is determined whether or not the above-mentioned AT mode flag F_ATmode is "1". When the determination result is NO, and CVT mode is to be performed, the process proceeds to step 51 and CVT mode control process is performed.

Figure 11:
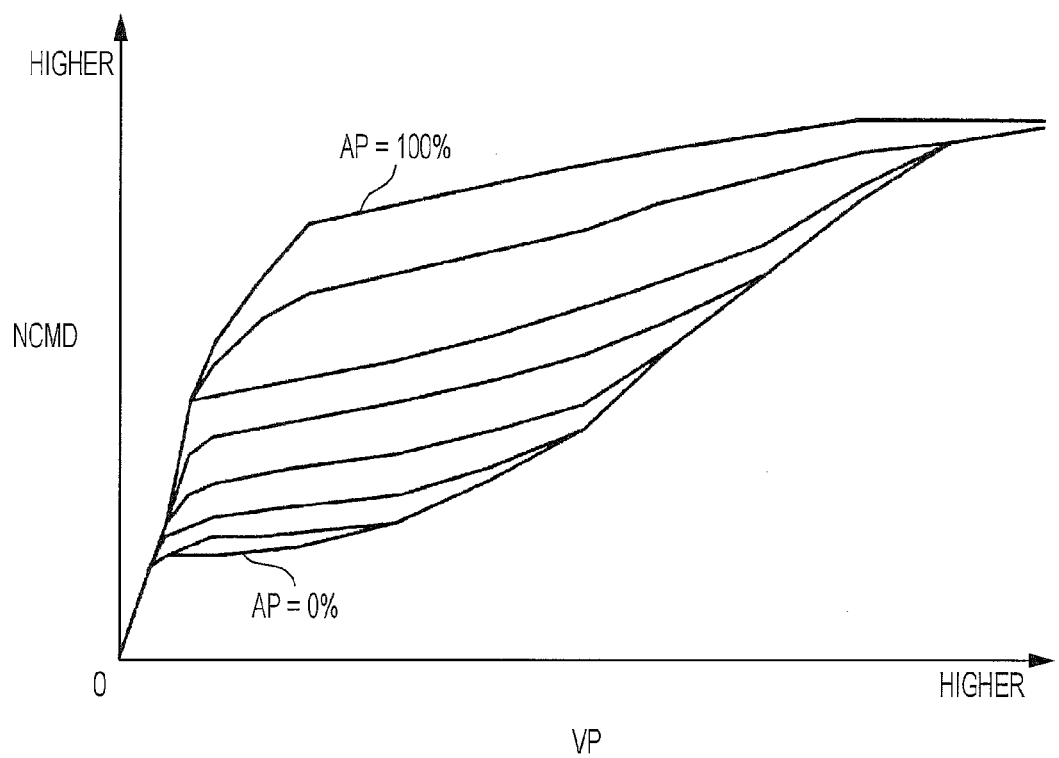
FIG. 11 is a graph illustrating an example of a map which is used for calculation of target rotation speed NCMD during control process of CVT mode.

In the CVT mode control process, first, a target rotation speed NCMD is determined by referring to the map illustrated in FIG. 11 according to the vehicle speed VP and the accelerator opening AP. As illustrated in FIG. 11, in the map, the target rotation speed NCMD is set to a higher value as the accelerator opening AP is increased. This is because an increased accelerator opening AP reflects a driver's request for more acceleration level, and in order to cope with the request, the above setting is made. The target rotation speed NCMD is set to a higher value as the vehicle speed VP increases. This is because when the vehicle speed VP increases, the engine rotation speed NE needs to be held at a higher value in order to maintain the increased vehicle speed VP.

A control command value NDRCMD is then calculated based on the target rotation speed NCMD, and a control command signal corresponding to the control command value NDRCMD is outputted to two hydraulic pressure control valves 46b. The transmission ratio of the continuously variable transmission 40 is thereby controlled so that the engine rotation speed NE reaches the target rotation speed NCMD. As described above, in step 51, the CVT mode control process is performed, then the present process is terminated.

On the other hand, when the determination result in step 50 is YES and AT mode is to be executed, the process proceeds to step 52, and as described below, the AT mode control process is performed, then the present process is terminated.

Figure 12:
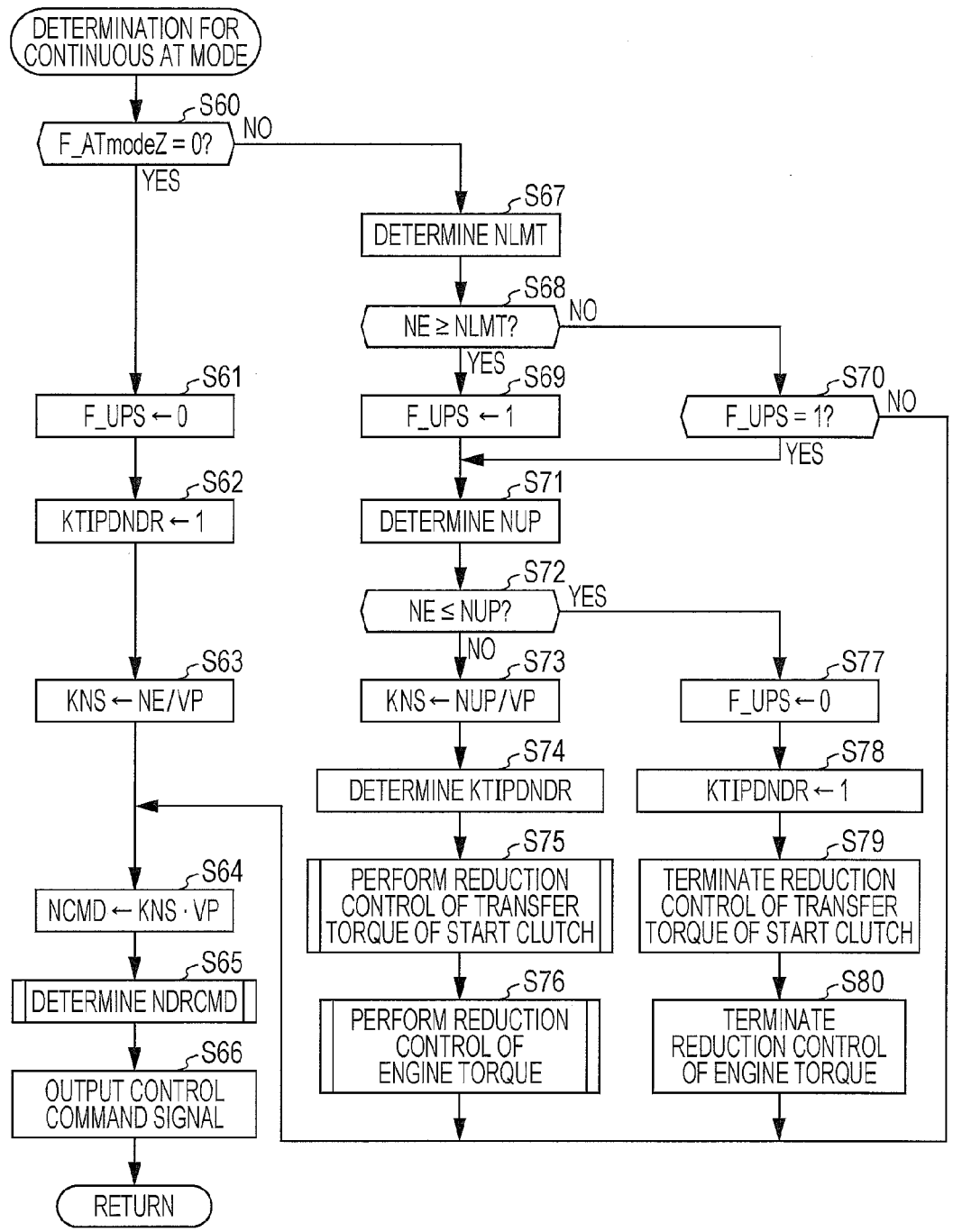
FIG. 12 is a flow chart illustrating AT mode control process.

Next, the AT mode control process in the aforementioned step 52 will be described with reference to FIG. 12. As illustrated in FIG. 12, first, in step 60, it is determined whether or not the previous value F_ATmodeZ of the AT mode flag is "0". When the determination result is YES and the current control timing is immediately after the execution conditions for AT mode are satisfied, the process proceeds to step 61 and the up shift transmission flag F_UPS is set to "0".

Subsequently, the process proceeds to step 62, and a transmission response compensation coefficient KTIPDNDR is set to a value of 1, then in step 63, a coefficient KNS is set to the quotient value (NE/VP) which is obtained by dividing the engine rotation speed NE by the vehicle speed VP. Next, in step 64, the target rotation speed NCMD is set to the product KNS·VP of the coefficient KNS and the vehicle speed VP.

Figure 13:
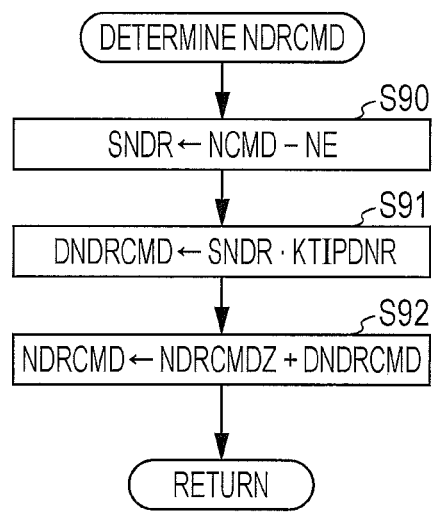
FIG. 13 is a flow chart illustrating a calculation process of control command value NDRCMD.

In step 65 subsequent to step 64, the calculation process for a control command value NDRCMD is performed. The calculation process is specifically performed as illustrated in FIG. 13. As illustrated in FIG. 13, first, in step 90, a deviation SNDR is set to the difference (NCMD−NE) between the target rotation speed NCMD and the engine rotation speed NE. Subsequently, the process proceeds to step 91, and an increment term DNDRCMD is set to the product SNDR·KTIPDNDR of the deviation SNDR and the transmission response compensation coefficient KTIPDNDR.

Subsequently, the process proceeds to step 92, and the control command value NDRCMD is set to the sum NDRCMDZ+DNDRCMD of a previous value NDRCMDZ and the increment term DNDRCMD, then the present process is terminated.

Returning to FIG. 12, after the control command value NDRCMD is calculated as described above in step 65, the process proceeds to step 66 and a control command signal corresponding to the control command value NDRCMD is supplied to the two hydraulic pressure control valves 46b, then the present process is terminated. Thus, the transmission ratio of the continuously variable transmission 40 is controlled so that the engine rotation speed NE converges to the target rotation speed NCMD at a change rate according to the transmission response compensation coefficient KTIPDNDR.

Figure 14:
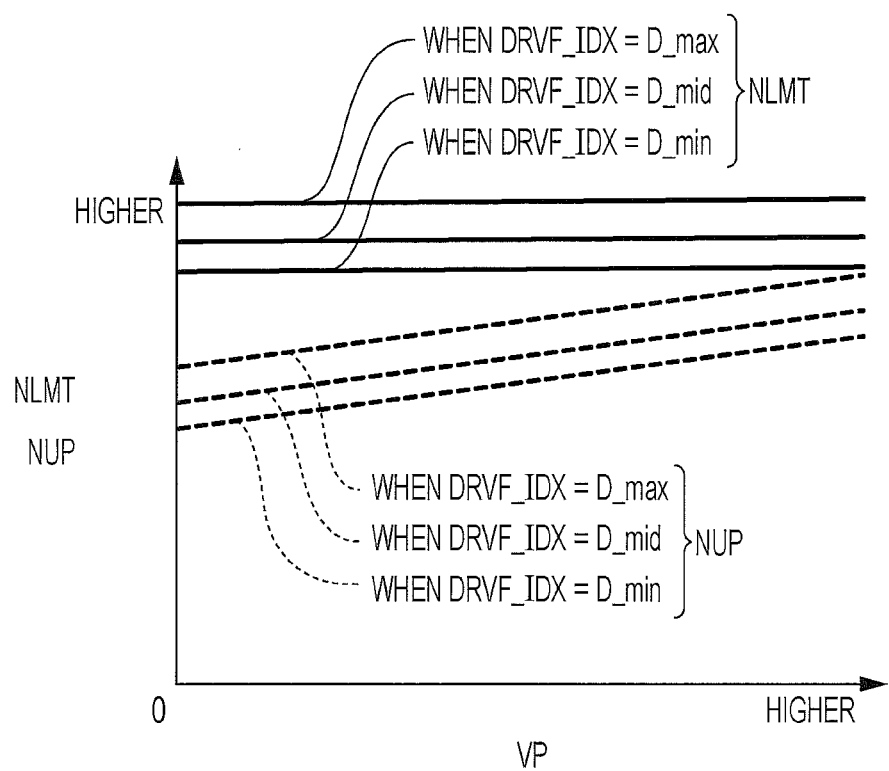
FIG. 14 is a graph illustrating an example of a map which is used for calculation of upper limit rotation speed NLMT and up shift rotation speed NUP.

On the other hand, when the determination result in the above-described step 60 is NO and the AT mode control process was performed in the previous or before the previous control timing, the process proceeds to step 67, and the upper limit rotation speed NLMT is determined by referring to the map (particularly the data indicated by a solid line) illustrated in FIG. 14 according to the vehicle speed VP and the drive feeling index value DRVF_IDX. In the map, the upper limit rotation speed NLMT is set to a higher value as the drive feeling index value DRVF_IDX is increased. This is because an increased drive feeling index value DRVF_IDX reflects a driver's request for more favorable accelerating performance and accelerator responsiveness, and in order to cope with the request, the engine rotation speed NE is maintained in a higher rotational speed range.

The data of the up shift rotation speed NUP indicated by a dashed line in FIG. 14 is used in step 71 described below.

Subsequently, the process proceeds to step 68 and it is determined whether or not the engine rotation speed NE is higher than or equal to the upper limit rotation speed NLMT. In an initial stage after the start of the AT mode control process, the engine rotation speed NE is low, and thus the determination result in step 68 is NO, and in this case, the process proceeds to step 70 and it is determined whether or not up shift transmission flag F_UPS is "1". In this case of the initial stage after the start of the AT mode control process, the determination result in step 70 is NO due to the execution of the above-described step 61, and in this case, as described above, steps 64 to 66 are performed, then the present process is terminated.

As described above, immediately after the start of the AT mode control process, the target rotation speed NCMD is set to the engine rotation speed NE in CVT mode immediately before switching to AT mode, and subsequently, the coefficient KNS is held at the value immediately after the switching unless the engine rotation speed NE exceeds the upper limit rotation speed NLMT. Thus, the engine rotation speed NE increases with the transmission ratio of the continuously variable transmission 40 being fixed to the value immediately after switching to AT mode, and accordingly, the vehicle speed VP increases in proportion to the engine rotation speed NE.

When the engine rotation speed NE reaches the upper limit rotation speed NLMT after the start of the AT mode control process, the determination result in the above-described step 68 is YES, and in this case, it is determined that the up shift transmission control is to be performed, and the process proceeds to step 69 and the up shift transmission flag F_UPS is set to "1" to reflect the determination, then the process proceeds to step 71.

On the other hand, when the up shift transmission flag F_UPS is set to "1" in step 69 in this manner, the determination result in the above-described step 70 is YES, and in this case, the process proceeds to step 71, too.

In step 71 subsequent to the above step 69 or 70, the up shift rotation speed NUP is determined by referring to the above-described map (particularly the data indicated by a dashed line) illustrated in FIG. 14 according to the vehicle speed VP and the drive feeling index value DRVF_IDX. In the map, the up shift rotation speed NUP is set to a higher value as the drive feeling index value DRVF_IDX is increased. This is because an increased drive feeling index value DRVF_IDX reflects a driver's request for more favorable accelerating performance and accelerator responsiveness, similarly to the above-described setting manner for the upper limit rotation speed NLMT, and in order to cope with the request, the engine rotation speed NE is maintained in a higher rotational speed range.

In the map, the up shift rotation speed NUP is set to vary linearly with the vehicle speed VP and to increase as the vehicle speed VP increases. This is because when the vehicle speed VP increases, the engine rotation speed NE needs to be maintained at a higher value in order to assure the acceleration performance. Furthermore, in the map, the up shift rotation speed NUP is set to a lower value than the upper limit rotation speed NLMT. This is for the purpose of properly performing the up shift control process.

Subsequently, the process proceeds to step 72 and it is determined whether or not the engine rotation speed NE is lower than or equal to the up shift rotation speed NUP. When the determination result is NO, and the engine rotation speed NE reaches the upper limit rotation speed NLMT and has not reduced to the up shift rotation speed NUP, the coefficient KNS for up shift is set to the quotient NUP/VP which is obtained by dividing the up shift rotation speed NUP by the vehicle speed VP.

Subsequently, in step 74, the transmission response compensation coefficient KTIPDNDR at the time of up shift transmission is calculated. The transmission response compensation coefficient KTIPDNDR defines the change rate of the transmission ratio in up shift transmission control, and is calculated by the following expression (1).

$$KTIPDNDR = KVTUPAT \cdot KAPTUPAT \cdot KVSSUP \quad (1)$$

In the above expression (1), KVTUPAT indicates a vehicle speed compensation coefficient, KAPTUPAT indicates an accelerator opening compensation coefficient, and KVSSUP indicates a transmission ratio compensation coefficient. These compensation coefficients are determined as described below.

Figure 15:
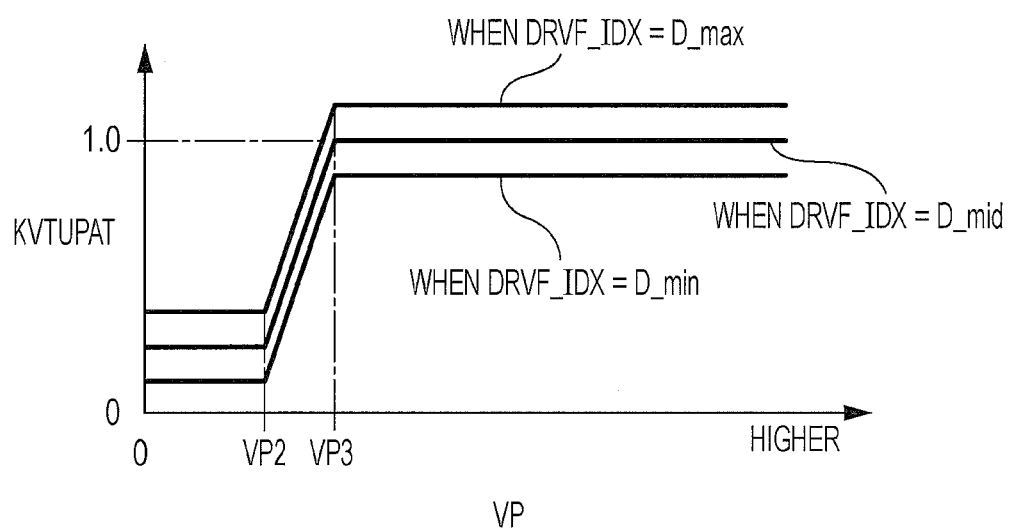
FIG. 15 is a graph illustrating an example of a map which is used for calculation of vehicle speed compensation coefficient KVTUPAT.

First, the vehicle speed compensation coefficient KVTUPAT is determined by referring to the map illustrated in FIG. 15 according to the vehicle speed VP and the drive feeling index value DRVF_IDX. In FIG. 15, VP2 and VP3 are predetermined values for the vehicle speed VP which satisfy VP2<VP3. In the map, the vehicle speed compensation coefficient KVTUPAT is set to a greater value as the drive feeling index value DRVF_IDX is increased. This is because an increased drive feeling index value DRVF_IDX reflects a driver's request for more favorable accelerating performance and accelerator responsiveness, and in order to cope with the request, the change rate of the transmission ratio (that is, the change rate of the engine rotation speed NE) is further increased.

In the map, the vehicle speed compensation term KVTUPAT is set to a greater value as the vehicle speed VP increases in the region where VP2≤VP≤VP3 in order to increase the change rate of the transmission ratio, whereas in other regions, the vehicle speed compensation term KVTUPAT is set to a constant value. Particularly, in the region where VP<VP2, the vehicle speed compensation term KVTUPAT is set to a constant value less than a value of 1.0. This is for the purpose of preventing a transmission shock which is likely to occur due to easily changeable vehicle speed VP at the time of acceleration in a low speed range.

Figure 16:
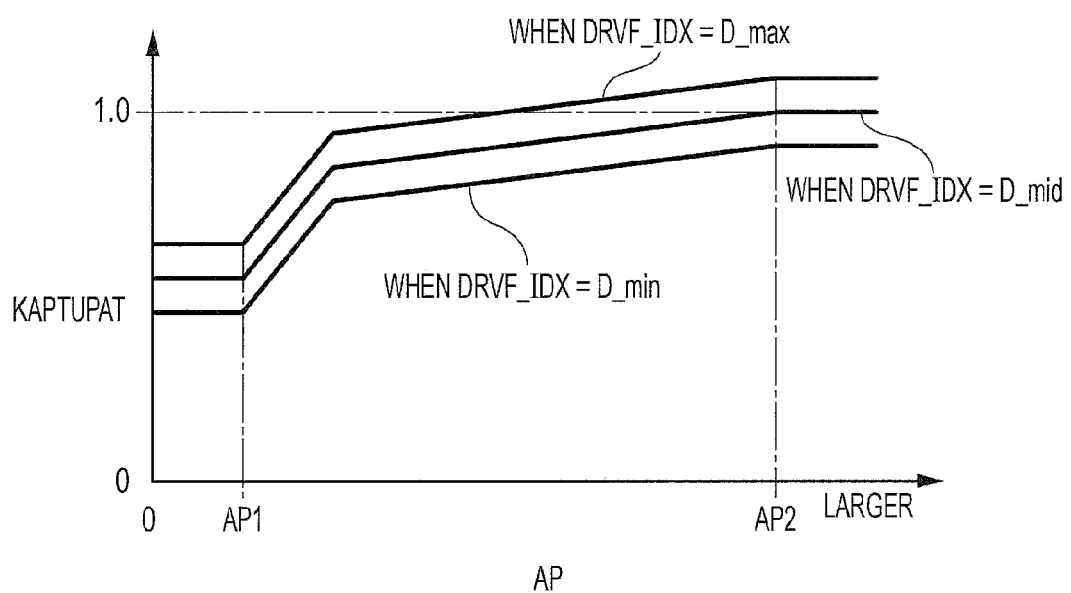
FIG. 16 is a graph illustrating an example of a map which is used for calculation of accelerator opening compensation coefficient KAPTUPAT.

The accelerator opening compensation coefficient KAPTUPAT is determined by referring to the map illustrated in FIG. 16 according to the accelerator opening AP and the drive feeling index value DRVF_IDX. In FIG. 16, AP1 and AP2 are predetermined values for the accelerator opening AP which satisfy AP1<AP2. In the map, the accelerator opening compensation coefficient KAPTUPAT is set to a greater value as the drive feeling index value DRVF_IDX is increased. This is based on the same reason for the manner how the vehicle speed compensation coefficient KVTUPAT is set.

In addition, the accelerator opening compensation coefficient KAPTUPAT is set to a greater value as the accelerator opening AP increases in the region where AP1≤AP≤AP2 in order to increase the change rate of the transmission ratio (that is, the change rate of the engine rotation speed NE), whereas in other regions, the accelerator opening compensation coefficient KAPTUPAT is set to a constant value. Particularly, in the region where AP<AP1, the accelerator opening compensation coefficient KAPTUPAT is set to a constant value less than a value of 1.0. This is for the purpose of preventing a transmission shock which is likely to occur due to easily changeable accelerator opening AP at the time of acceleration in a low speed range.

Figure 17:
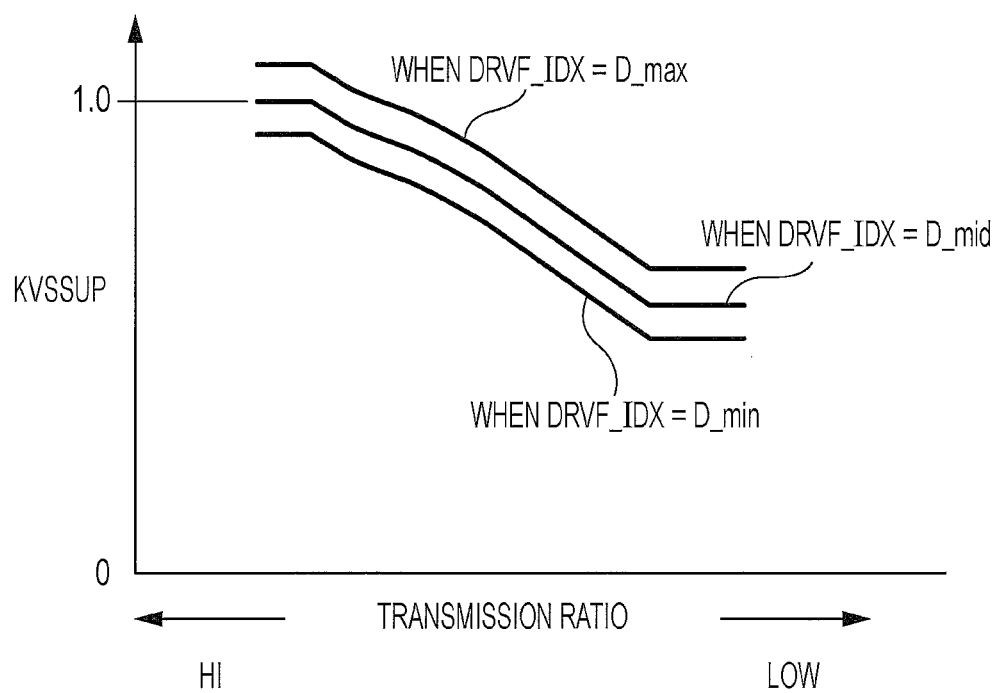
FIG. 17 is a graph illustrating an example of a map which is used for calculation of transmission ratio compensation term KVSSUP.

The transmission ratio compensation term KVSSUP is determined by referring to the map illustrated in FIG. 17 according to the transmission ratio and the drive feeling index value DRVF_IDX. In the above, the transmission ratio is calculated based on a CRK signal of the crank angle sensor 11 and a detection signal of the vehicle speed sensor 12. In the map, the transmission ratio compensation term KVSSUP is set to a greater value as the drive feeling index value DRVF_IDX is increased. This is based on the same reason for the above-described manner how the two compensation coefficients KVTUPAT, KAPTUPAT are set.

In addition, the transmission ratio compensation term KVSSUP is set to a smaller value for the transmission ratio as the transmission ratio is reduced. This is for the purpose of preventing a transmission shock which is likely to occur due to a torque variation that increases as the transmission ratio becomes lower.

Returning to FIG. 12, the transmission response compensation coefficient KTIPDNDR at the time of up shift transmission is determined in step 74 as described above, then the process proceeds to step 75 and reduction control of the transfer torque of the start clutch 50 is performed. Subsequently, in step 76, reduction control of the engine torque is performed. Subsequently, as described above, steps 64 to 66 are performed, then the present process is terminated.

As described above, in AT mode control process, during a time after the engine rotation speed NE reaches the upper limit rotation speed NLMT until the engine rotation speed NE becomes lower than or equal to the up shift rotation speed NUP, the coefficient KNS is calculated to be less than the value before in step 73, and the target rotation speed NCMD is calculated using such a coefficient KNS in step 64, so that the transmission ratio is controlled at a value for a higher speed, different from a previous value of the transmission ratio before the engine rotation speed NE reaches the upper limit rotation speed NLMT, that is, up shift transmission control is performed.

On the other hand, when the determination result in the above-described step 72 is YES, that is, when the engine rotation speed NE becomes lower than or equal to the up shift rotation speed NUP during the up shift transmission control, it is determined that the up shift transmission control is to be terminated, and the process proceeds to step 77 and the up shift transmission flag F_UPS is set to "0" to reflect the determination.

Subsequently, the process proceeds to step 78, and the transmission response compensation coefficient KTIPDNDR is set to a value of 1, then in steps 79, 80, transfer torque reduction control process for the start clutch 50 and reduction control process for the engine torque are each terminated. Subsequently, as described above, steps 64 to 66 are performed, then the present process is terminated.

Figure 18:
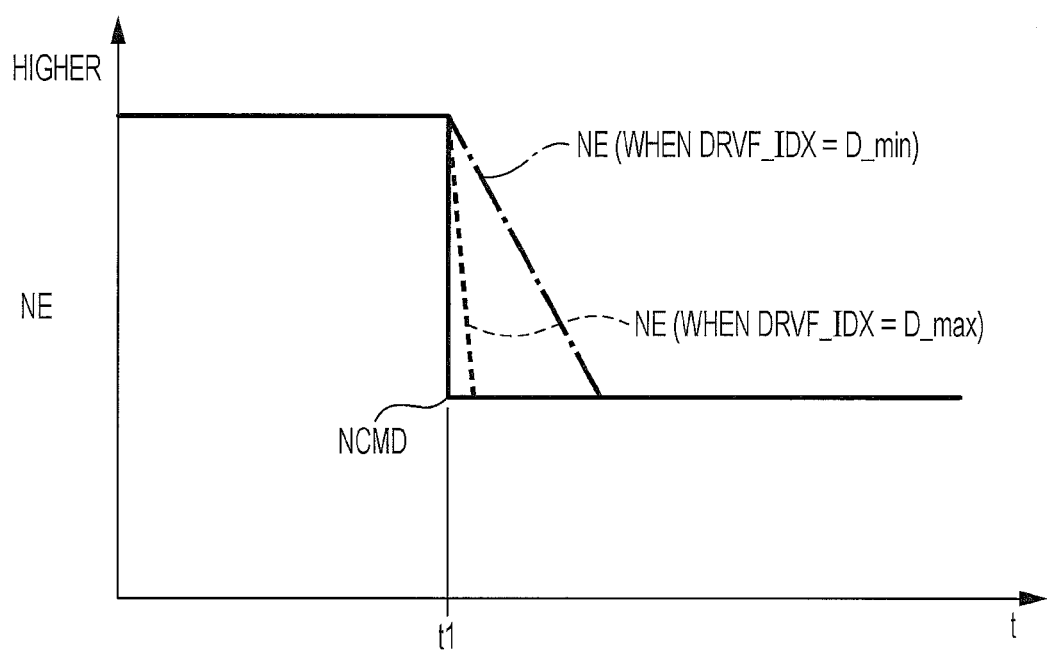
FIG. 18 is a timing chart illustrating a relationship between drive feeling index value DRVF_IDX and responsiveness of engine rotation speed NE to the target rotation speed NCMD at the time of up shift transmission.

When the AT mode control process is performed as described above, the responsiveness (following performance) to the target rotation speed NCMD of the engine rotation speed NE at the start of the up shift transmission control is, for example, as illustrated in FIG. 18. As illustrated in FIG. 18, the up shift transmission control is started at time t1, and when the target rotation speed NCMD is set to a value lower than the previous value at time t1 or before, the following speed to the target rotation speed NCMD of the engine rotation speed NE when the drive feeling index value DRVF_IDX=D_max is higher than the following speed when the drive feeling index value DRVF_IDX=D_min. That is, it can be seen that setting the drive feeling index value DRVF_IDX to a greater value causes the change rate of the transmission ratio to increase, and thus the responsiveness of the continuously variable transmission 40 is improved. Although not illustrated, the engine rotation speed NE becomes lower than or equal to the up shift rotation speed NUP, then the engine rotation speed NE increases toward the upper limit rotation speed NLMT at an increasing rate which is higher when the drive feeling index value DRVF_IDX=D_max than an increasing rate when the drive feeling index value DRVF_IDX=D_min.

As described above, with the control apparatus 1 in the present embodiment, in the transmission mode determination process in FIG. 6, AT mode flag F_ATmode is set, and in the transmission mode control process in FIG. 10, the AT mode control process is performed when the AT mode flag F_ATmode=1, and the CVT mode control process is performed when the AT mode flag F_ATmode=0.

In the AT mode control process, when the determination result in step 68 in FIG. 12 is YES and the engine rotation speed NE reaches the upper limit rotation speed NLMT, the up shift transmission control is started. Thus, the transmission ratio is controlled at a value for a higher speed, so that the engine rotation speed NE becomes lower than the upper limit rotation speed NLMT, and the engine rotation speed NE thereby is once reduced. Subsequently, when the engine rotation speed NE becomes lower than or equal to the up shift rotation speed NUP, and the determination result in step 72 indicates YES, the up shift transmission control is terminated. Accordingly, when a driver requests for acceleration, the engine rotation speed NE is increased again. By the above control, the engine rotation speed NE is not fixed during the AT mode control process, and thus it is possible to cope with a driver's request for acceleration performance.

In the case where the determination result in step 39 is YES in the continuous AT mode determination process of FIG. 9, that is, in the case where the engine rotation speed NE becomes lower than or equal to the up shift rotation speed NUP during the up shift transmission control process, when the engine rotation speed NE becomes lower than the AT mode end rotation speed NES which is lower than the up shift rotation speed NUP, the AT mode flag F_ATmode is set to "0". The transmission mode control process is thereby shifted from the AT mode control process to the CVT mode control process, and the engine rotation speed NE thereby can be increased and a favorable acceleration feeling is assured.

Furthermore, in the above cases, each of the three rotation speeds NLMT, NUP, NES is set according to the drive feeling index value DRVF_IDX, and thus a value reflecting the drive feeling set by a driver, that is, a value reflecting the request of a driver for drive feeling is determined. Thus, the transmission mode control process and the transmission ratio control can be performed while reflecting the drive feeling condition set by a driver by using the three rotation speeds NLMT, NUP, NES. That is, the transmission mode control process and the transmission ratio control can be performed while satisfying the request of a driver for drive feeling. The marketability thereby can be improved. Furthermore, the upper limit rotation speed NLMT and the up shift rotation speed NUP are determined according to the vehicle speed VP in addition to the drive feeling index value DRVF_IDX, and thus the transmission ratio of the continuously variable transmission 40 can be controlled more appropriately according to the vehicle speed VP.

During execution of the AT mode control process, the vehicle speed compensation coefficient KVTUPA is determined according to the vehicle speed VP and the drive feeling index value DRVF_IDX; the accelerator opening compensation coefficient KAPTUPAT is determined according to the accelerator opening AP and the drive feeling index value DRVF_IDX; a transmission ratio compensation coefficient KVSSUP is determined according to the transmission ratio and the drive feeling index value DRVF_IDX; and the transmission response compensation coefficient KTIPDNDR is calculated as the product, KVTUPAT·KAPTUPAT·KVSSUP of these three compensation coefficients. In the above calculation, the transmission response compensation coefficient KTIPDNDR is a value which defines the change rate of the transmission ratio during up shift transmission control, and thus the change rate of the transmission ratio of the continuously variable transmission 40 can be compensated according to the vehicle speed VP, the accelerator opening AP, the transmission ratio of the continuously variable transmission 40, and the drive feeling index value DRVF_IDX. Consequently, a transmission feeling satisfying the drive feeling requested by a driver can be achieved according to the driving condition of the vehicle V as well.

Further, when the determination result in each of steps 14, 16 is YES in the transmission mode determination process of FIG. 6, that is, when the engine rotation speed NE and the target rotation speed NCMD each exceed the AT mode start rotation speed NSS, and the accelerator change amount DAP is greater than the AT mode start determination value DAPSS during execution of the CVT mode control process, the AT mode flag F_ATmode is set to "1". Consequently, the transmission mode control process is switched from the CVT mode control process to the AT mode control process. In the above step, the AT mode start rotation speed NSS is determined according to the vehicle speed VP and the drive feeling index value DRVF_IDX, and thus the AT mode control process can be started at a timing when the engine rotation speed NE is increased up to a value which achieves the drive feeling set by a driver. That is, switching from the CVT mode control process to the AT mode control process can be performed at a timing for satisfying the request of a driver for drive feeling, and the marketability thereby can be further improved.

In addition, when the determination result in step 16 is NO, that is, when the accelerator opening AP is decreased at a relatively large decrease rate, the AT mode control process is prohibited and the CVT mode control process is performed. In the above step, because the AT mode start determination value DAPSS is set according to the drive feeling index value DRVF_IDX, even when the amount of operation performed by a driver on the accelerator pedal is decreasing at a relatively large decrease rate, selection of the AT mode control process is prohibited and the CVT mode control process can be performed so as to satisfy the request of a driver for drive feeling. The marketability thereby can be further improved.

In addition, when the determination result in step 30 is YES in the continuous AT mode determination process of FIG. 9, that is, when the increase rate at the time of increase of the accelerator opening AP is relatively large, the AT mode control process is prohibited and the CVT mode control process is performed. In the above step, because the AT mode release determination value DAPKS is set according to the drive feeling index value DRVF_IDX, even when the amount of operation performed by a driver on the accelerator pedal is increasing at a relatively large increase rate, selection of the AT mode control process is prohibited and the CVT mode control process can be performed so as to satisfy the request of a driver for drive feeling. The marketability thereby can be further improved.

When the determination result in step 34 is YES in the continuous AT mode determination process of FIG. 9, that is, when the engine rotation speed NE reaches the upper limit rotation speed NLMT during execution of the AT mode control process, and the accelerator change amount DAP is less than the AT mode end determination value DAPES, the AT mode flag F_ATmode is set to "0". In other words, when the amount of operation performed by a driver on the accelerator pedal is decreasing at a relatively large decrease rate at a moment when the engine rotation speed NE reaches the upper limit rotation speed NLMT during execution of the AT mode control process, the CVT mode control process is performed. In the above step, the AT mode end determination value DAPES is set according to the drive feeling index value DRVF_IDX, and thus even when the amount of operation performed by a driver on the accelerator pedal is decreasing at a relatively large decrease rate during execution of the AT mode control process, the transmission mode can be switched from the AT mode control process to the CVT mode control process, and the CVT mode control process can be performed so as to satisfy the request of the driver for drive feeling. The marketability thereby can be further improved.

When the determination result in step 72 is NO in the AT mode control process of FIG. 12, that is, when the engine rotation speed NE has not reduced to the up shift rotation speed NUP during the up shift transmission control, transfer torque reduction control process for the start clutch 50 and engine torque reduction process are performed. In this manner, during the up shift transmission, the transfer torque of the start clutch 50 falls below the previous transfer torque not during the up shift transmission, and the input torque inputted to the continuously variable transmission 40 falls below the previous input torque not during the up shift transmission, and thus a variation of torque in the up shift transmission can be controlled, and a transmission shock thereby can be reduced.

In step 74 of the AT mode control process in the embodiment, the transmission response compensation coefficient KTIPDNDR at the time of up shift transmission is calculated by the above-mentioned method. However, instead of this, the transmission response compensation coefficient KTIPDNDR at the time of up shift transmission may be calculated by the expression (2) below.

$$KTIPDNDR = KDRVF \cdot KVTUPAT \cdot KAPTUPAT \cdot KVSSUP \quad (2)$$

Figure 19:
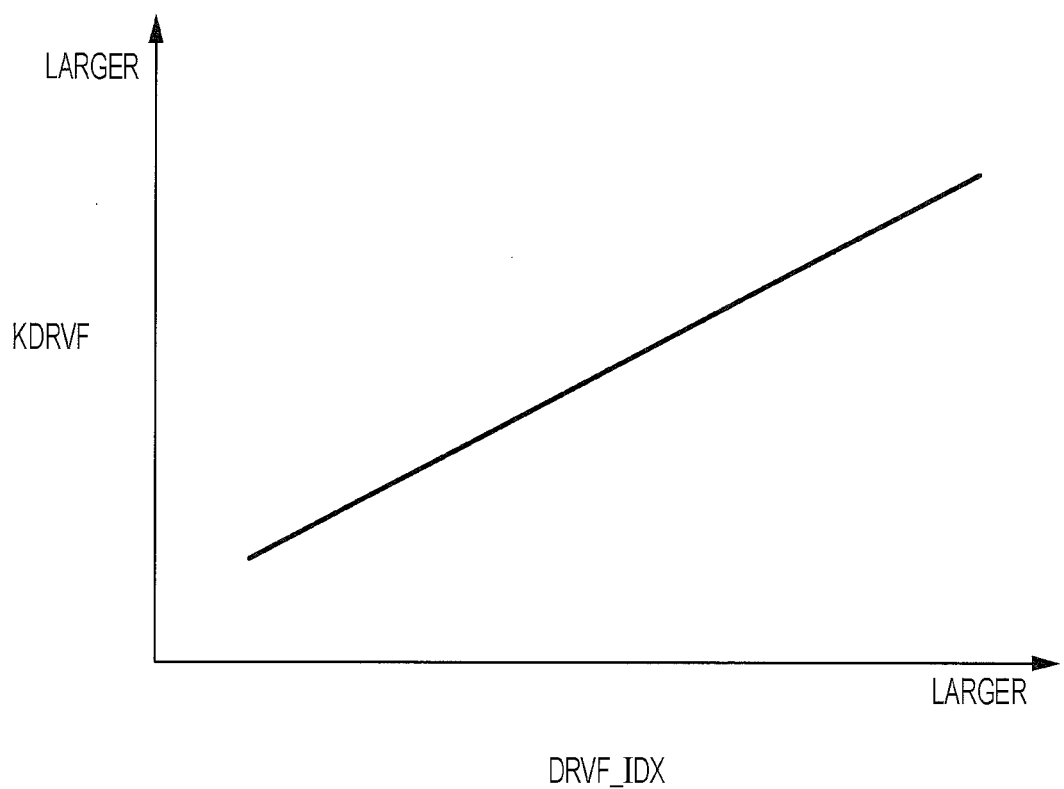
FIG. 19 is a graph illustrating an example of a map which is used for calculation of drive feeling compensation coefficient KDRVF.

In the expression (2), KDRVF is a drive feeling compensation coefficient and is determined by referring to the map illustrated in FIG. 19 according to the drive feeling index value DRVF_IDX. In the map, the drive feeling compensation coefficient KDRVF is set to vary linearly with the drive feeling index value DRVF_IDX and to increase as the drive feeling index value DRVF_IDX is increased. As described above, this is because an increased drive feeling index value DRVF_IDX reflects a driver's request for more favorable accelerating performance and accelerator responsiveness, and in order to cope with the request, the change rate of the transmission ratio is increased.

In the above expression (2), the vehicle speed compensation coefficient KVTUPAT is determined by referring to the above-described data with the drive feeling index value DRVF_IDX=D_mid in the map illustrated in FIG. 15, according to the vehicle speed VP. In addition, the accelerator opening compensation coefficient KAPTUPAT and the transmission ratio compensation term KVSSUP are determined by referring to the data with the drive feeling index value DRVF_IDX=D_mid in the map illustrated in FIGS. 16, 17, according to the vehicle speed VP.

With the transmission response compensation coefficient KTIPDNDR determined by the above method, the same operational effect as in the embodiment can be obtained.

The embodiment is an example in which a set of the requirements for the execution conditions for AT mode is that the above-described three conditions (a1) to (a3) are all satisfied and the determination result in step 11 is YES. However, a set of the requirements for the execution conditions for AT mode may be that the vehicle speed VP is lower than the above-mentioned predetermined speed and the above-described conditions (a2), (a3) are satisfied. In this case, it is sufficient to set the AT mode start rotation speed NSS to a lower value as the drive feeling index value DRVF_IDX is increased in the above-described map of FIG. 7.

The embodiment is an example in which the drive feeling mode setting switch 15 is used as a drive feeling setting device, however, the drive feeling setting device of the present disclosure is not limited to this, and may be any device via which a drive feeling of the vehicle can be set by a driver's operation. For example, as a drive feeling setting device, a device may be used which allows a setting position of drive feeling mode to be manually switched between three levels: sport mode position, normal mode position, and eco mode position, or to be switched between the three mode positions continuously or stepwise in three levels in response to a driver's voice.

The embodiment is an example in which the drive feeling index value DRVF_IDX is used as an indicative value for the setting condition of the drive feeling setting device, however, instead of the drive feeling index value DRVF_IDX, the switch output value SW_OUT may be used. In this case, as the above-described maps of FIG. 7, FIG. 14 to FIG. 17, it is sufficient to use a map which is defined according to the switch output value SW_OUT.

The embodiment is an example in which the upper limit rotation speed NLMT is determined as the first predetermined rotation speed according to the drive feeling index value DRVF_IDX and the vehicle speed VP, however, the upper limit rotation speed NLMT may be determined according to the drive feeling index value DRVF_IDX and the accelerator opening AP, or according to the drive feeling index value DRVF_IDX, the vehicle speed VP, and the accelerator opening AP.

The embodiment is an example in which the up shift rotation speed NUP is determined as the second predetermined rotation speed according to the drive feeling index value DRVF_IDX and the vehicle speed VP, however, the up shift rotation speed NUP may be determined according to the drive feeling index value DRVF_IDX and the accelerator opening AP, or according to the drive feeling index value DRVF_IDX, the vehicle speed VP, and the accelerator opening AP.

The embodiment is an example in which the transmission response compensation coefficient KTIPDNDR is determined according to the vehicle speed VP, the accelerator opening AP, the transmission ratio, and the drive feeling index value DRVF_IDX, however, the transmission response compensation coefficient KTIPDNDR may be determined according to at least one of these four parameters.

In the embodiment, the AT mode flag F_ATmode is set to "1" under the necessary condition that each of the target rotation speed NCMD and the engine rotation speed NE is higher than the AT mode start rotation speed NSS. However, instead of this, the AT mode flag F_ATmode may be set to "1" under the necessary condition that one of the target rotation speed NCMD and the engine rotation speed NE is higher than the AT mode start rotation speed NSS.

The embodiment is an example in which the accelerator opening AP is used as the load parameter, however, the load parameter of the present disclosure is not limited to this, and may be an indicative parameter for the load of the internal combustion engine. For example, the opening of a throttle valve or intake air amount may be used as the load parameter.

The embodiment is an example in which the accelerator pedal is used as an accelerator device, however, the accelerator device of the present disclosure is not limited to this, and may be a device via which a request of a driver for acceleration can be inputted. For example, as an accelerator device, it is possible to use a lever like a throttle lever of a motorcycle which receives an input of manual operation of a driver, a device which receives an input of a driver's physical motion except an arm or leg motion, or a device which receives an input of driver's voice.

The embodiment is an example in which the accelerator opening AP is used as an acceleration operation amount, however, the acceleration operation amount of the present disclosure is not limited to this, and may be an indicative amount of the operation performed by a driver on the accelerator device. For example, when a lever like a throttle lever of a motorcycle is used as the accelerator device, the amount of rotation of the throttle lever may be used as the acceleration operation amount.

The embodiment is an example in which the accelerator change amount DAP is used as a decrease level parameter, however, the decrease level parameter of the present disclosure is not limited to this, and may be an indicative parameter for the decrease level of the acceleration operation amount. For example, the following may be used as the decrease level parameter: the ratio of the current value to the previous value of the accelerator opening AP, the reciprocal of the ratio, or the absolute value of the difference between the current value and the previous value of the accelerator opening AP.

The embodiment is an example in which the accelerator change amount DAP is used as an increase level of the acceleration operation amount, however, the increase level of the acceleration operation amount of the present disclosure is not limited to this, and may be an indicative value for the increase level of the acceleration operation amount. For example, the following may be used as the increase level of the acceleration operation amount: the ratio of the current value to the previous value of the accelerator opening AP, the reciprocal of the ratio, or the absolute value of the difference between the current value and the previous value of the accelerator opening AP.

The embodiment is an example in which a four-wheel vehicle is used as the vehicle, however, the vehicle of the acceleration operation amount of the present disclosure is not limited to this, and may be any vehicle on which an internal combustion engine is mounted as a power source. For example, a vehicle having two wheels or six or more wheels, a snow vehicle, or a full-track vehicle such as a tank may be used.

A first aspect of the disclosure provides a control apparatus (control apparatus 1) for a continuously variable transmission (continuously variable transmission 40), the control apparatus (control apparatus 1) being capable of continuously changing an output of an internal combustion engine (internal combustion engine 3) mounted on a vehicle V, and allowing a transmission mode to be switchable between a continuous transmission mode in which a transmission ratio is set continuously and a stepped transmission mode in which the transmission ratio is set stepwise, the control apparatus including: a driving condition parameter detection unit (vehicle speed sensor 12, accelerator opening sensor 13) configured to detect a driving condition parameter which indicates a driving condition of the vehicle; an engine rotation speed detection unit (ECU 2, crank angle sensor 11) configured to detect an engine rotation speed which is a rotation speed of the internal combustion engine; a drive feeling setting device (drive feeling mode setting switch 15) which is operated by a driver to set a drive feeling for the vehicle; a predetermined rotation speed setting unit (ECU 2, steps 38, 67, 71) configured to set one of first to third predetermined rotation speeds (upper limit rotation speed NLMT, up shift rotation speed NUP, AT mode end rotation speed NES) according to a setting condition for drive feeling (drive feeling index value DRVF_IDX) in the drive feeling setting device; a transmission mode selection unit (ECU 2, steps 10 to 19, 30 to 38, 50) configured to select one of the continuous transmission mode and the stepped transmission mode as the transmission mode; and a transmission ratio control unit (ECU 2, steps 64 to 66, 73 to 76) configured to control the transmission ratio according to the detected driving condition parameter and the selected transmission mode, and to control the transmission ratio in such a manner that in the case where the stepped transmission mode is selected, when the engine rotation speed reaches the first predetermined rotation speed (upper limit rotation speed NLMT), the transmission ratio is controlled at a value for a higher speed rather than a value for a lower speed before the engine rotation speed reaches the first predetermined rotation speed so that the engine rotation speed becomes lower than the first predetermined rotation speed. The transmission mode selection unit is configured to change the transmission mode (steps 35, 39, 50) in such a manner that in the case where the stepped transmission mode is selected, when the engine rotation speed reaches the first predetermined rotation speed, then falls below the second predetermined rotation speed (up shift rotation speed NUP) which is lower than the first predetermined rotation speed, and further falls below the third predetermined rotation speed (AT mode end rotation speed NES), the transmission mode is switched from the stepped transmission mode to the continuous transmission mode.

According to the first aspect of the disclosure mentioned above, a driving condition parameter indicating a driving condition of the vehicle is detected, and one of the continuous transmission mode and the stepped transmission mode is selected as a transmission mode. In addition, the transmission ratio is controlled according to the detected driving condition parameter and the selected transmission mode, and in the case where the stepped transmission mode is selected, when the engine rotation speed reaches the first predetermined rotation speed, the transmission ratio is controlled at a value for a higher speed compared with a previous value before the engine rotation speed reaches the first predetermined rotation speed, so that the engine rotation speed becomes lower than the first predetermined rotation speed. Under such a control, when the engine rotation speed continues to increase due to a driver's request for acceleration in the stepped transmission mode, the transmission ratio of the continuously variable transmission automatically shifts up, and accordingly, the engine rotation speed decreases once, then later increases again. Thus, the engine rotation speed does not remain constant, and it is possible to properly reflect the driver's request for acceleration.

In addition, in the case where the stepped transmission mode is selected, when the engine rotation speed reaches the first predetermined rotation speed, then falls below the second predetermined rotation speed which is lower than the first predetermined rotation speed, the transmission mode is switched from the stepped transmission mode to the continuous transmission mode when the engine rotation speed falls below the third predetermined rotation speed. Thus, for example, in the case where the transmission ratio of the continuously variable transmission is set to a relatively higher value in the stepped transmission mode and driving force is reduced by up shift, when the engine rotation speed becomes lower than the third predetermined rotation speed, the transmission mode is shifted to the continuous transmission mode, and the engine rotation speed thereby can be increased and a favorable acceleration feeling can be assured.

In the above case, the first to third predetermined engine rotation speeds are set according to a setting condition for drive feeling in the drive feeling setting device which is operated by a driver to set a drive feeling of the vehicle, and thus each of the first to third predetermined engine rotation speeds reflects the drive feeling set by the driver, that is, each engine rotation speed is determined to be a value which reflects the request of the driver for drive feeling. Consequently, by using such first to third predetermined engine rotation speeds, switching of the transmission mode and control of the transmission ratio can be performed while reflecting the setting condition for drive feeling requested by a driver. That is, selection of transmission mode and control of the transmission ratio can be performed while satisfying the request of a driver for drive feeling, and the marketability thereby can be improved.

A second aspect of the disclosure provides the control apparatus (control apparatus 1) for the continuously variable transmission (continuously variable transmission 40) according to the first aspect of the disclosure, in which the driving condition parameter detection unit preferably includes: a vehicle speed detection unit (vehicle speed sensor 12) configured to detect a speed of the vehicle as the driving condition parameter; and a load parameter detection unit (accelerator opening sensor 13) configured to detect a load parameter (accelerator opening AP) as the driving condition parameter, the load parameter indicating a load of the internal combustion engine, and the predetermined rotation speed setting unit is preferably configured to set the first predetermined rotation speed and the second predetermined rotation speed according to at least one of the vehicle speed and the load parameter (accelerator opening AP) in addition to the setting condition for drive feeling.

According to the second aspect of the disclosure mentioned above, the first predetermined rotation speed and the second predetermined rotation speed are set according to at least one of the vehicle speed and the load parameter in addition to the setting condition for drive feeling, and thus the transmission ratio of the continuously variable transmission can be controlled more appropriately according to the vehicle speed and the load of the internal combustion engine.

A third aspect of the disclosure provides the control apparatus (control apparatus 1) for the continuously variable transmission (continuously variable transmission 40) according to the first aspect of the disclosure, in which the driving condition parameter detection unit preferably includes: a vehicle speed detection unit (vehicle speed sensor 12) configured to detect a speed of the vehicle as the driving condition parameter; and a load parameter detection unit (accelerator opening sensor 13) configured to detect a load parameter (accelerator opening AP) as the driving condition parameter, the load parameter indicating a load of the internal combustion engine, and the transmission ratio control unit preferably includes a compensating unit (ECU 2, steps 65, 74) configured to compensate a rate of change of the transmission ratio in such a manner that in the case where the stepped transmission mode is selected, when the engine rotation speed reaches the first predetermined rotation speed (upper limit rotation speed NLMT), the rate of change to the value for a higher speed is compensated according to at least one of the vehicle speed, the load parameter (accelerator opening AP), the transmission ratio, and the setting condition for drive feeling (drive feeling index value DRVF_IDX).

According to the third aspect of the disclosure mentioned above, when the transmission mode is the stepped transmission mode, the rate of change of the transmission ratio to the value for a higher speed is compensated according to at least one of the vehicle speed, the load parameter, the transmission ratio, and the setting condition for drive feeling, and thus a transmission feeling satisfying the request of a driver for drive feeling can be obtained according to the driving condition of the vehicle as well.

A fourth aspect of the disclosure provides the control apparatus (control apparatus 1) for the continuously variable transmission (continuously variable transmission 40) according to the first aspect of the disclosure, preferably further including a target rotation speed setting unit (ECU 2, step 64) configured to set a target rotation speed which is a target of the engine rotation speed; and a fourth predetermined rotation speed setting unit (ECU 2, step 13) configured to set a fourth predetermined rotation speed (AT mode start rotation speed NSS) according to the setting condition for drive feeling. In the case where the continuous transmission mode is selected (steps 12 to 14, 17, 50), when at least one of the set target rotation speed and the engine rotation speed exceeds the set fourth predetermined rotation speed (AT mode start rotation speed NSS), the transmission mode selection unit preferably switches the transmission mode from the continuous transmission mode to the stepped transmission mode.

According to the fourth aspect of the disclosure mentioned above, in the case where the continuous transmission mode is selected, when at least one of the target rotation speed and the engine rotation speed exceeds the fourth predetermined rotation speed, the transmission mode is switched from the continuous transmission mode to the stepped transmission mode. In the above step, the fourth predetermined rotation speed is set according to the setting condition for drive feeling, and thus the stepped transmission mode can be started at a timing when the engine rotation speed is increased up to a value which achieves the drive feeling set by a driver. That is, switching from the continuous transmission mode to the stepped transmission mode can be performed at a timing for satisfying the request of a driver for drive feeling, and the marketability thereby can be further improved.

A fifth aspect of the disclosure provides the control apparatus (control apparatus 1) for the continuously variable transmission (continuously variable transmission 40) according to the first aspect of the disclosure, in which the driving condition parameter detection unit preferably includes: an acceleration operation amount detection unit (accelerator opening sensor 13) configured to detect an acceleration operation amount (accelerator opening AP) as the driving condition parameter, the acceleration operation amount being an amount of operation performed by a driver on an accelerator device (accelerator pedal); a decrease level parameter calculation unit (ECU 2) configured to calculate a decrease level parameter (accelerator change amount DAP) which indicates a decrease level of the acceleration operation amount (accelerator opening AP); and a reference decrease level setting unit (ECU 2, step 15) configured to set a reference decrease level (AT mode start determination value DAPSS) according to the setting condition for drive feeling, the reference decrease level serving as a reference for the decrease level of the acceleration operation amount, and the transmission mode selection unit is preferably configured to prohibit selection of the stepped transmission mode (steps 16, 18) when the decrease level indicated by the calculated decrease level parameter is greater than or equal to the set reference decrease level.

According to the fifth aspect of the disclosure mentioned above, when a decrease level indicated by the calculated decrease level parameter is greater than or equal to the set reference decrease level, selection of the stepped transmission mode is prohibited. That is, when the amount of operation performed by a driver on the accelerator device is decreasing at a relatively large decrease rate, the continuous transmission mode is performed. In the above step, the reference decrease level is set according to the setting condition for drive feeling, and thus even when the amount of operation performed by a driver on the accelerator device is decreasing at a relatively large decrease rate, selection of the stepped transmission mode is prohibited and the continuous transmission mode can be performed so as to satisfy the request of the driver for drive feeling. The marketability thereby can be further improved.

A sixth aspect of the disclosure provides the control apparatus (control apparatus 1) for the continuously variable transmission (continuously variable transmission 40) according to the first aspect of the disclosure, in which the driving condition parameter detection unit preferably includes: an acceleration operation amount detection unit (accelerator opening sensor 13) configured to detect an acceleration operation amount (accelerator opening AP) as the driving condition parameter, the acceleration operation amount being an amount of operation performed by a driver on an accelerator device (accelerator pedal); an increase level calculation unit (ECU 2) configured to calculate an increase level (accelerator change amount DAP) of the acceleration operation amount (accelerator opening AP); and a reference increase level setting unit (ECU 2, step 30) configured to set a reference increase level (AT mode release determination value DAPKS) according to the setting condition for drive feeling, the reference increase level serving as a reference for the increase level of the acceleration operation amount, and the transmission mode selection unit is preferably configured to prohibit selection of the stepped transmission mode (steps 31, 35) when the increase level of the calculated acceleration operation amount is greater than the reference increase level.

According to the sixth aspect of the disclosure mentioned above, when the increase level of the calculated acceleration operation amount is greater than the reference increase level, selection of the stepped transmission mode is prohibited. That is, when the amount of operation performed by a driver on the accelerator device is increasing at a relatively large increase rate, the continuous transmission mode is performed. In the above step, the reference increase level is set according to the setting condition for drive feeling, and thus even when the amount of operation performed by a driver on the accelerator device is increasing at a relatively large increase rate, selection of the stepped transmission mode is prohibited and the continuous transmission mode can be performed so as to satisfy the request of the driver for drive feeling. The marketability thereby can be further improved.

A seventh aspect of the disclosure provides the control apparatus (control apparatus 1) for the continuously variable transmission (continuously variable transmission 40) according to the first aspect of the disclosure, in which the driving condition parameter detection unit preferably includes: an acceleration operation amount detection unit configured to detect an acceleration operation amount as the driving condition parameter, the acceleration operation amount being an amount of operation performed by a driver on an accelerator device; a decrease level parameter calculation unit (ECU 2) configured to calculate a decrease level parameter (accelerator change amount DAP) which indicates a decrease level of the acceleration operation amount (accelerator opening AP);

and a reference decrease level setting unit (ECU 2, step 33) configured to set a reference decrease level (AT mode end determination value DAPES) according to the setting condition for drive feeling, the reference decrease level serving as a reference for the decrease level of the acceleration operation amount, and in the case where the stepped transmission mode is selected and the engine rotation speed reaches the first predetermined rotation speed, when the decrease level indicated by the calculated decrease level parameter is greater than the set reference decrease level, the transmission mode selection unit preferably switches the transmission mode from the stepped transmission mode to the continuous transmission mode (steps 34, 35, 50).

According to the seventh aspect of the disclosure mentioned above, in the case where the stepped transmission mode is selected and the engine rotation speed reaches the first predetermined rotation speed, when the decrease level indicated by the calculated decrease level parameter is greater than the set reference decrease level, the transmission mode is switched from the stepped transmission mode to the continuous transmission mode. That is, during execution of the stepped transmission mode, when the amount of operation performed by a driver on the accelerator device is decreasing at a relatively large decrease rate, the continuous transmission mode is performed. In the above step, the reference decrease level is set according to the setting condition for drive feeling, and thus even when the amount of operation performed by a driver on the accelerator device is decreasing at a relatively large decrease rate during execution of the stepped transmission mode, the transmission mode is switched from the stepped transmission mode to the continuous transmission mode and the continuous transmission mode can be performed so as to satisfy the request of the driver for drive feeling. The marketability thereby can be further improved.

An eighth aspect of the disclosure provides the control apparatus (control apparatus 1) for the continuously variable transmission (continuously variable transmission 40) according to the first aspect of the disclosure, in which a clutch (start clutch 50) for transferring torque of the internal combustion engine to driving wheels is preferably provided between the internal combustion engine and the driving wheels of the vehicle, and the control apparatus preferably further comprises a transfer torque reduction unit (ECU 2, step 75) configured to, during the change of the transmission ratio to the value for a higher speed, reduce a transfer torque of the clutch to a level lower than a transfer torque not during the change.

According to the eighth aspect of the disclosure mentioned above, during the change of the transmission ratio to the value for a higher speed, that is, during up shift transmission, a transfer torque of the clutch is reduced to a level lower than a transfer torque not during the change, and thus a variation of torque in the up shift transmission can be controlled, and a transmission shock thereby can be reduced.

A ninth aspect of the disclosure provides the control apparatus (control apparatus 1) for the continuously variable transmission (continuously variable transmission 40) according to the first aspect of the disclosure, preferably further including an input torque reduction unit (ECU 2, step 76) configured to, during the change of the transmission ratio to the value for a higher speed, reduce a torque inputted to the continuously variable transmission to a level lower than an input torque not during the change.

According to the ninth aspect of the disclosure mentioned above, a torque inputted to the continuously variable transmission during up shift transmission is reduced to a level lower than an input torque not during the up shift transmission, and thus, similarly to the eighth aspect of the disclosure, a transmission shock can be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus for a continuously variable transmission, the control apparatus being capable of continuously changing an output of an internal combustion engine mounted on a vehicle and allowing a transmission mode to be switchable between a continuous transmission mode in which a transmission ratio is set continuously and a stepped transmission mode in which the transmission ratio is set stepwise, the control apparatus comprising:
    a driving condition parameter detector configured to detect a driving condition parameter which indicates a driving condition of the vehicle;
    an engine rotation speed detector configured to detect an engine rotation speed;
    a drive feeling setting device to set a drive feeling for the vehicle;
    a predetermined rotation speed setting device configured to set one of a first predetermined rotation speed, a second predetermined rotation speed and a third predetermined rotation speed according to a setting condition for drive feeling in the drive feeling setting device;
    a transmission mode selector configured to select one of the continuous transmission mode and the stepped transmission mode as the transmission mode; and
    a transmission ratio controller configured to control the transmission ratio according to the driving condition parameter detected by the driving condition parameter detector and the transmission mode selected by the transmission mode selector, the transmission ratio controller being configured to control the transmission ratio in such a manner that in a case where the stepped transmission mode is selected, when the engine rotation speed reaches the first predetermined rotation speed, the transmission ratio is controlled at a value for a higher speed, different from a value before the engine rotation speed reaches the first predetermined rotation speed so that the engine rotation speed becomes lower than the first predetermined rotation speed,
    wherein the transmission mode selector is configured to change the transmission mode in such a manner that in a case where the stepped transmission mode is selected, when the engine rotation speed reaches the first predetermined rotation speed, then falls below the second predetermined rotation speed which is lower than the first predetermined rotation speed, and further falls below the third predetermined rotation speed, the transmission mode is switched from the stepped transmission mode to the continuous transmission mode.

2. The control apparatus for a continuously variable transmission according to claim 1,
    wherein the driving condition parameter detector includes
        a vehicle speed detector configured to detect a speed of the vehicle as the driving condition parameter, and
        a load parameter detector configured to detect a load parameter as the driving condition parameter, the load parameter indicating a load of the internal combustion engine, and
    wherein the predetermined rotation speed setting device is configured to set the first predetermined rotation speed and the second predetermined rotation speed according to at least one of a speed of the vehicle and the load parameter in addition to the setting condition for drive feeling.

3. The control apparatus for a continuously variable transmission according to claim 1,
wherein the driving condition parameter detector includes
a vehicle speed detector configured to detect a speed of the vehicle as the driving condition parameter, and
a load parameter detector configured to detect a load parameter as the driving condition parameter, the load parameter indicating a load of the internal combustion engine, and
wherein the transmission ratio controller includes a compensating device configured to compensate a rate of change of the transmission ratio in such a manner that in a case where the stepped transmission mode is selected, when the engine rotation speed reaches the first predetermined rotation speed, the rate of change to the value for a higher speed is compensated according to at least one of the vehicle speed, the load parameter, the transmission ratio, and the setting condition for drive feeling.

4. The control apparatus for a continuously variable transmission according to claim 1, further comprising:
a target rotation speed setting device configured to set a target rotation speed which is a target of the engine rotation speed; and
a fourth predetermined rotation speed setting device configured to set a fourth predetermined rotation speed according to the setting condition for drive feeling,
wherein in a case where the continuous transmission mode is selected, when at least one of the target rotation speed set by the target rotation speed setting device and the engine rotation speed exceeds the fourth predetermined rotation speed set by the fourth predetermined rotation speed setting device, the transmission mode selector switches the transmission mode from the continuous transmission mode to the stepped transmission mode.

5. The control apparatus for a continuously variable transmission according to claim 1,
wherein the driving condition parameter detector includes
an acceleration operation amount detector configured to detect an acceleration operation amount as the driving condition parameter, the acceleration operation amount being an amount of operation performed by a driver on an accelerator device,
a decrease level parameter calculator configured to calculate a decrease level parameter which indicates a decrease level of the acceleration operation amount, and
a reference decrease level setting device configured to set a reference decrease level according to the setting condition for drive feeling, the reference decrease level serving as a reference for the decrease level of the acceleration operation amount, and
wherein the transmission mode selector is configured to prohibit selection of the stepped transmission mode when the decrease level indicated by the decrease level parameter calculated by the decrease level parameter calculator is greater than or equal to the reference decrease level set by the reference decrease level setting device.

6. The control apparatus for a continuously variable transmission according to claim 1,
wherein the driving condition parameter detector includes
an acceleration operation amount detector configured to detect an acceleration operation amount as the driving condition parameter, the acceleration operation amount being an amount of operation performed by a driver on an accelerator device,
an increase level calculator configured to calculate an increase level of the acceleration operation amount, and
a reference increase level setting device configured to set a reference increase level according to the setting condition for drive feeling, the reference increase level serving as a reference for the increase level of the acceleration operation amount, and
wherein the transmission mode selector is configured to prohibit selection of the stepped transmission mode when the increase level of the acceleration operation amount calculated by the increase level calculator is greater than the reference increase level.

7. The control apparatus for a continuously variable transmission according to claim 1,
wherein the driving condition parameter detector includes
an acceleration operation amount detector configured to detect an acceleration operation amount as the driving condition parameter, the acceleration operation amount being an amount of operation performed by a driver on an accelerator device,
a decrease level parameter calculator configured to calculate a decrease level parameter which indicates a decrease level of the acceleration operation amount, and
a reference decrease level setting device configured to set a reference decrease level according to the setting condition for drive feeling, the reference decrease level serving as a reference for the decrease level of the acceleration operation amount, and
wherein in a case where the stepped transmission mode is selected and the engine rotation speed reaches the first predetermined rotation speed, when the decrease level indicated by the decrease level parameter calculated by the decrease level parameter calculator is greater than the reference decrease level set by the reference decrease level setting device, the transmission mode selector switches the transmission mode from the stepped transmission mode to the continuous transmission mode.

8. The control apparatus for a continuously variable transmission according to claim 1,
wherein a clutch is provided between the internal combustion engine and the driving wheels of the vehicle to transfer torque of the internal combustion engine to driving wheels, and
the control apparatus further comprises a transfer torque reductor configured to, during a change of the transmission ratio to the value for a higher speed, reduce a transfer torque of the clutch to a level lower than a transfer torque not during the change.

9. The control for a continuously variable transmission according to claim 1, further comprising:
an input torque reductor configured to, during a change of the transmission ratio to the value for a higher speed, reduce a torque inputted to the continuously variable transmission to a level lower than an input torque not during the change.

* * * * *